US011527172B2

(12) United States Patent
Goldman et al.

(10) Patent No.: US 11,527,172 B2
(45) Date of Patent: Dec. 13, 2022

(54) SYSTEM AND METHOD FOR AUTOMATICALLY ATTACHING A TAG AND HIGHLIGHT IN A SINGLE ACTION

(71) Applicant: Renaissance Learning, Inc., Wisconsin Rapids, WI (US)

(72) Inventors: Andrew Goldman, Pacific Palisades, CA (US); Andrew John Storey Cooper, Deception Bay (AU); Todd Allen Robertson, Wisconsin Rapids, WI (US); Adam Iarossi, Victoria (AU)

(73) Assignee: Renaissance Learning, Inc., Wisconsin Rapids, WI (US)

(*) Notice: Subject to any disclaimer, the term of this patent is extended or adjusted under 35 U.S.C. 154(b) by 353 days.

(21) Appl. No.: 14/474,025

(22) Filed: Aug. 29, 2014

(65) Prior Publication Data

US 2015/0064685 A1 Mar. 5, 2015

Related U.S. Application Data

(60) Provisional application No. 61/872,470, filed on Aug. 30, 2013.

(51) Int. Cl.
*G09B 5/10* (2006.01)
*G09B 5/14* (2006.01)
*G06F 3/0481* (2022.01)
*G06F 40/117* (2020.01)
*G06F 40/186* (2020.01)

(52) U.S. Cl.
CPC ............ *G09B 5/10* (2013.01); *G06F 3/0481* (2013.01); *G06F 40/117* (2020.01); *G06F 40/186* (2020.01); *G09B 5/14* (2013.01)

(58) Field of Classification Search
CPC .... G09B 5/10; G09B 5/14; G06F 40/186; G06F 40/117; G06F 3/0481
USPC .................................................. 434/428
See application file for complete search history.

(56) References Cited

U.S. PATENT DOCUMENTS

| 9,251,130 | B1* | 2/2016 | Lynnes | G06Q 10/10 |
| 2003/0050927 | A1* | 3/2003 | Hussam | G06F 16/904 |
| 2004/0117354 | A1* | 6/2004 | Azzaro | G06F 16/30 |
| 2005/0223315 | A1 | 10/2005 | Shimizu et al. | |
| 2005/0283723 | A1* | 12/2005 | Fish | G06F 17/21 715/230 |

(Continued)

OTHER PUBLICATIONS

International Search Report, International Application No. PCT/US2014/53600, dated Aug. 29, 2014, 10 pgs.

*Primary Examiner* — Kesha Frisby
(74) *Attorney, Agent, or Firm* — Patent Law Works LLP

(57) ABSTRACT

A system and methods are disclosed for enabling users to attach a tag and highlight in a single action or activity to a select piece or portion of text in digital content (e.g., in a digital book or other content provided for viewing on an electronic device). In some implementations, the teacher may associate a tag with a particular text in the assignment, push the assignment embedding the tag to one or more students, and the tag becomes automatically visible to the one or more students through their highlight menu when they open up the assignment for completion. In some implementations, with this single activity, users may easily share tasks, comments etc., with ease. One or more other activities are also used among teachers and students to create and execute assignments with efficiency.

28 Claims, 32 Drawing Sheets

(56) References Cited

U.S. PATENT DOCUMENTS

| | | | |
|---|---|---|---|
| 2007/0196808 A1* | 8/2007 | Call | G09B 5/00 434/350 |
| 2008/0005101 A1* | 1/2008 | Chandra | G06F 16/951 |
| 2008/0016091 A1* | 1/2008 | Chandra | G06F 17/2247 |
| 2008/0027933 A1* | 1/2008 | Hussam | G06F 16/338 |
| 2008/0288862 A1* | 11/2008 | Smetters | G06F 17/218 715/255 |
| 2009/0282087 A1* | 11/2009 | Muller | G06F 16/986 |
| 2009/0287646 A1* | 11/2009 | Maciocci | G06F 16/957 |
| 2010/0151431 A1* | 6/2010 | Miller | G09B 5/00 434/350 |
| 2010/0262659 A1* | 10/2010 | Christiansen | G06F 17/241 709/205 |
| 2010/0306698 A1* | 12/2010 | Sellers | G06K 9/222 715/805 |
| 2010/0318893 A1* | 12/2010 | Matthews | G06F 17/241 715/230 |
| 2011/0083090 A1* | 4/2011 | Gwiazda | G06F 16/958 715/769 |
| 2011/0175855 A1* | 7/2011 | Youn | G06F 3/03545 345/179 |
| 2012/0036423 A1* | 2/2012 | Haynes, II | G06Q 30/0201 715/230 |
| 2013/0013812 A1* | 1/2013 | Kessel | H04L 67/1095 709/248 |
| 2013/0019175 A1* | 1/2013 | Kotler | G06F 3/04886 715/728 |
| 2013/0047115 A1* | 2/2013 | Migos | G06F 17/241 715/776 |
| 2013/0104028 A1* | 4/2013 | Murray | G06F 15/0291 715/234 |
| 2013/0189666 A1* | 7/2013 | Nolasco | G09B 7/02 434/350 |
| 2013/0295535 A1* | 11/2013 | Levy | G09B 17/003 434/169 |
| 2014/0038163 A1* | 2/2014 | Karpoff | G09B 5/00 434/362 |
| 2014/0068507 A1* | 3/2014 | Nam | G06F 3/0488 715/802 |
| 2014/0101527 A1* | 4/2014 | Suciu | G06F 17/218 715/230 |
| 2014/0101780 A1* | 4/2014 | Zuber | G06Q 40/02 726/28 |
| 2014/0108921 A1* | 4/2014 | Chen | G06F 17/2247 715/236 |
| 2014/0162243 A1* | 6/2014 | Lamkin | G09B 5/08 434/365 |
| 2014/0184531 A1* | 7/2014 | Demiya | G06F 40/169 345/173 |
| 2014/0210860 A1* | 7/2014 | Caissy | G06F 3/0338 345/659 |
| 2014/0234824 A1* | 8/2014 | Schepman | G09B 7/02 434/350 |
| 2014/0310305 A1* | 10/2014 | Christiansen | G06F 17/241 707/769 |
| 2014/0317488 A1* | 10/2014 | Lutz | G06F 17/241 715/230 |
| 2015/0058716 A1* | 2/2015 | Boothman | G06F 17/218 715/254 |
| 2015/0187225 A1* | 7/2015 | Worsley | G09B 7/07 434/178 |
| 2015/0212707 A1* | 7/2015 | Norwood | G06F 40/166 715/773 |
| 2015/0220227 A1* | 8/2015 | Landau | G06F 17/24 715/201 |
| 2015/0286636 A1* | 10/2015 | Elkhou | G06F 16/93 707/722 |
| 2015/0381722 A1* | 12/2015 | Lam | G09B 7/02 715/753 |

\* cited by examiner

ALICE'S ADVENTURES IN WONDERLAND

Chapter 3

A Caucus-Race and a Long Tale

They were *[Highlight] [Discuss] [Search] [Copy]* g party that birds with dra close them, and an dripping wet, cross, and uncomfortable. The first question of course was, how to get dry again; they had a consultation about this, and after a few minutes it seemed quite natural to Alice to find herself talking familiarly with them, as if she had known them all her life. Indeed, she had quite a long argument with the Lory, who at last turned sulky, and would only say, "I'm older than you, and must know better." And this Alice would not allow, without knowing how old it was, and, as the Lory positively refused to tell its age, there was no more to be said.

At last the Mouse, who seemed to be a person of authority among them, called out, "Sit down, all of you, and listen to me! I'll soon make you dry enough!" They

Figure 14

Chapter 3

A Caucus-Race and a Long Tale

Create your highlight
Visible to just you
[ Edit ]

| No Tag | No Tag | No Tag | No Tag | No Tag | rty that birds
e them, and
dripping wet, cross, and uncomfortable.

The first question of course was, how to get dry again: they had a consultation about this, and after a few minutes it seemed quite natural to Alice to find herself talking familiarly with them, as if she had known them all her life. Indeed, she had quite a long argument with the Lory, who at last turned sulky, and would only say, "I'm older than you, and must know better." And this Alice would not allow, without knowing how old it was, and, as the Lory positively refused to tell its age, there was no more to be said.

At last the Mouse, who seemed to be a person of authority among them, called out, "Sit down, all of you, and listen to me! I'll soon make you dry enough!" They

ALICE'S ADVENTURES IN WONDERLAND

Chapter 3

A Caucus Race and a Long Tale

Edit highlight tags and sharing [Sharing] [Done]
Visible to just you

[Add Tag] [Add Tag] [Add Tag] [Add Tag] [Add Tag]

...rty that birds ...e them, and ... dripping wet, cross, and uncomfortable.

The first question of course was, how to get dry again: they had a consultation about this, and after a few minutes it seemed quite natural to Alice to find herself talking familiarly with them, as if she had known them all her life. Indeed, she had quite a long argument with the Lory, who at last turned sulky, and would only say, "I'm older than you, and must know better." And this Alice would not allow, without knowing how old it was, and, as the Lory positively refused to tell its age, there was no more to be said.

At last the Mouse, who seemed to be a person of authority among them, called out, "Sit down, all of you, and listen to me! I'll soon make you dry enough!" They 17 of 81    4 pages left in chapter

Figure 16

Chapter 3

Create your highlight
Visible to just you
[Edit]

| evidence | No Tag | No Tag | No Tag | No Tag |

...ty that birds ...e them, and ...ripping wet, cross, and uncomfortable.

The first question of course was, how to get dry again: they had a consultation about this, and after a few minutes it seemed quite natural to Alice to find herself talking familiarly with them, as if she had known them all her life. Indeed, she had quite a long argument with the Lory, who at last turned sulky, and would only say, "I'm older than you, and must know better." And this Alice would not allow, without knowing how old it was, and, as the Lory positively refused to tell its age, there was no more to be said.

At last the Mouse, who seemed to be a person of authority among them, called out, "Sit down, all of you, and listen to me! I'll soon make you dry enough!" They

Figure 18

SYSTEM AND METHOD FOR AUTOMATICALLY ATTACHING A TAG AND HIGHLIGHT IN A SINGLE ACTION

CROSS-REFERENCE TO RELATED APPLICATIONS

This application claims the benefit under 35 U.S.C. § 119(e) of U.S. Provisional Patent Application No. 61/872,470, entitled "System and Method for Automatically Attaching a Tag in a Single Action," filed on Aug. 30, 2013, the entire contents of which are incorporated herein by reference.

BACKGROUND

1. Field of the Invention

The present invention relates to viewing and sharing of electronic content (e.g., digital books, notes associated with a particular section of book, electronic article or any other available text or content presented for viewing on a suitable electronic device) via electronic shared platforms (e.g., e-reading platform) and networks. More particularly, the present invention relates to attaching a tag and highlight in a single action or activity to an "event" or a select piece or portion of text in the electronic content. In some implementations, a user (e.g., a teacher) may create an assignment and "push" or send the tag with the assignment to other users (e.g. students). When the other user or student opens the assigned book to the assigned page range, their highlight menu will automatically show the tag "event."

2. Description of the Related Art

The popularity and use of the Internet and shared networks that facilitate viewing of electronic content and sharing thoughts and comments about the electronic content has increased dramatically in recent years. Users typically communicate about subjects of common interest with others via the internet and shared networks. There are tools to mark select electronic content before sharing with others. Yet, current tools are limited to highlighting functions that enable a user to emphasize and differentiate select text or providing tags with comments for transmission to other viewers with whom a user may wish to share comments.

In particular in the educational arena, education and learning are promoted via e-reading platforms designed and configured to engage and deliver instructional reading experiences within the evolving digital class room or forum.

There is a need in the industry for better tools that are efficient and easy for users to use to facilitate communication and collaboration.

SUMMARY

The present technology overcomes the deficiencies and limitations of prior systems and methods, at least in part by, providing improved systems and methods for automatically attaching a tag and a highlight to electronic content in a single action or activity. In some implementations, this activity is used by a user (e.g. teacher) with one or more other activities (e.g., sharing, presenting questions and answers etc.) to create and send assignments to other users (e.g. students) who must accomplish the assignments. In some instances, the text may be a digital book, an electronic article, or any other available text content presented by a suitable electronic device. In some implementations, the text may be the text content on a page of a digital book available on the web or downloaded as an ePub (electronic publication) or document in PDF format (portable document format). Example activities that may be performed by a user on an example assignment may include highlighting & tagging, sharing of highlighted & tagged text with others users or user groups, searching of highlighted & tagged text, discussing the highlighted & tagged text with other users or user groups, performing mark ups for a text (e.g., underline, strikethrough, bold, italicize, font size change, font style change, etc.), copying and pasting a highlighted and tagged text, inserting a comment/sticky notes for a particular text, text alignment, number and paragraph formatting etc.

By allowing users to attach a tag and highlight in a single action or activity, to an "event" or a select portion of text that they are reading, users can easily make quick notes and search through them later when they proceed from simply reading, viewing or glancing over the content to either studying or writing about it at a later time. The highlight and tag operation in a single action advantageously facilitates easy editing of content and sharing of content with others.

In some implementations, the system and methods of the present invention is advantageous in educational environments, permitting a teacher to create assignments for students that may include a highlight and tag with instructions. In this platform, the teacher may "push" or send the tag through the assignment to other users (e.g. students). When the other users or students open the assigned book to the assigned page range, their highlight menu will automatically show the tag "event." After the student tags text with "event," the highlighted sections of text will show up in the assignment. Once the student finishes and submits the assignment, the teacher is then able to drill down on each student and see what they highlighted with the tag "event."

The students may apply the instructions in the tag as they complete the assignment. The system and methods of the present invention, in some examples, may permit teachers to assign tasks to students via this platform. As one example, a teacher may ask a student to find the metaphors and similes in a particular chapter of an electronic book. In other implementations, the students may submit their assignments, with adding to the tag or creating another tag (one or more) that would be visible to the teacher and which may be easily reviewed by the teachers. In other scenarios, the highlight and tag operation may be used among users for myriad reasons, including sharing comments and thoughts in interactive sessions.

In accordance with one implementation, the method is implemented with computing devices, including computing devices by which users may view or peruse through electronic content. The method provides a user interface to the users, which is configured to permit the user to execute a single activity with respect to at least a portion of the electronic content, the single activity including highlighting and tagging of the portion of the electronic content. The method provides the electronic content with at least the portion of the text that is highlighted and tagged in the single activity to other users.

The system and methods disclosed below may be advantageous in a number of respects. They provide a significant improvement over existing systems and other solutions that exist.

BRIEF DESCRIPTION OF THE DRAWINGS

The present invention is illustrated by way of example, and not by way of limitation in the figures of the accompanying drawings in which like reference numerals are used to refer to the same or similar elements.

FIG. 14 is a graphical representation illustrating one or more example options provided to an example user upon selecting or designating particular text.

FIG. 15 is a graphical representation illustrating one or more example highlighting options or configurations for highlighting particular text.

FIG. 16 is a graphical representation illustrating example options for adding one or more tags to particular text.

FIG. 18 is a graphical representation illustrating sharing, tag, and/or highlighting status associated with example text.

DETAILED DESCRIPTION

Figure 1:
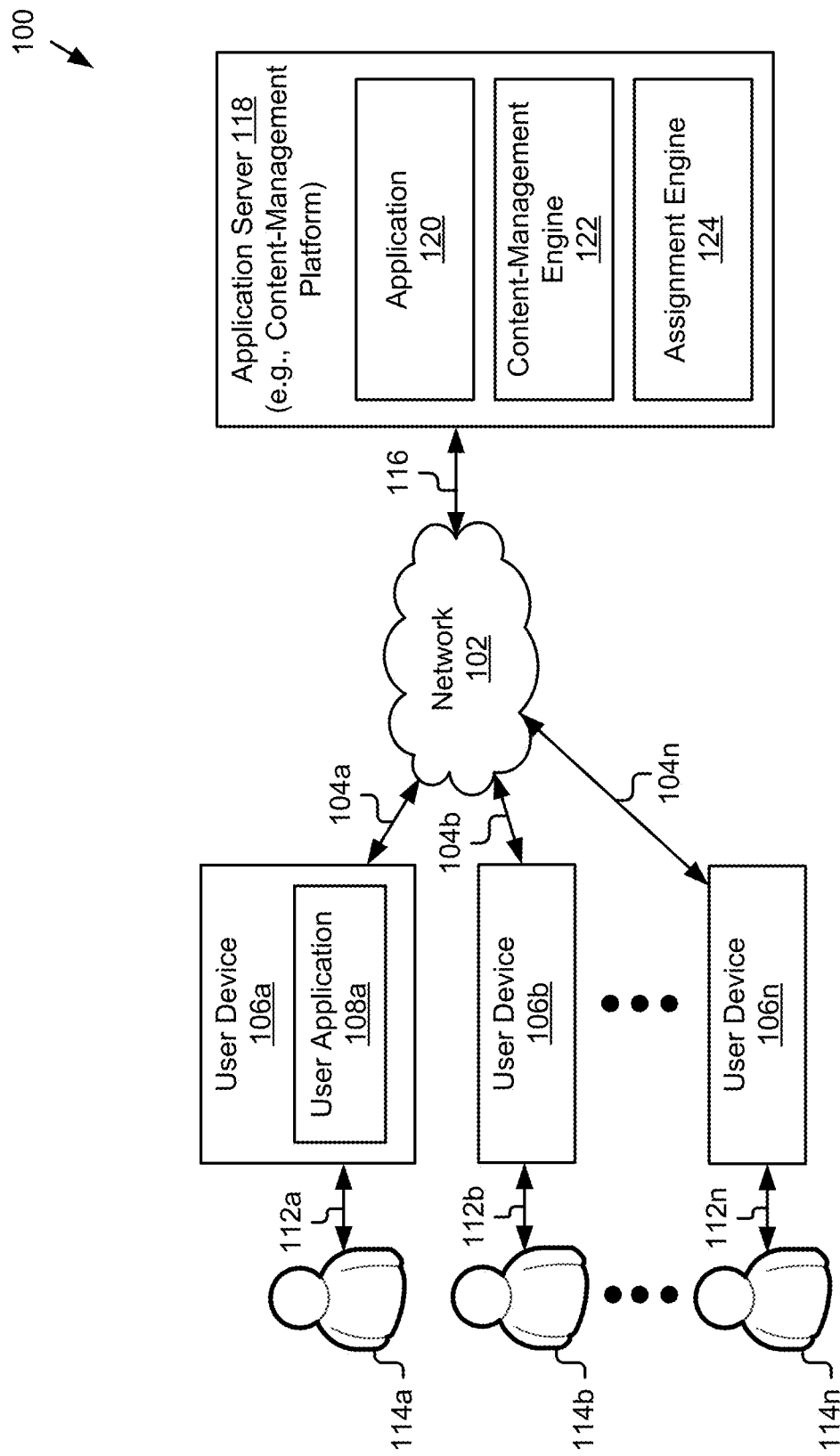
FIG. 1 is a high-level block diagram illustrating an example system configured to facilitate a tag and highlight operation in a single action or activity, by users while viewing electronic content.

The systems and methods of this technology are directed to system architecture, technical platforms (e.g., reading platforms) and methods configured to provide users viewing electronic content with improved tools and user interface to facilitate perusing the electronic content with ease, digesting it and otherwise organizing it for their use. Such platforms facilitate digital reading and enable collaboration in the pages of digital books, articles, and documents, enabling users to embed materials and assignments in the text itself. In particular, the system platform and methods of the present invention facilitate attaching highlight and tag functions to a piece or portion of text in a single action or activity. In some implementations, the text of interest to a particular user may be a digital book, an electronic article, or any other available text content presented by a suitable electronic device. In some examples, the text may be the text content on a page of a digital book available on the web or downloaded as an ePub (electronic publication) or PDF (portable document format).

The system and methods, by allowing users to attach a tag and highlight to a portion of the text of interest to the user make it easy for the users to search through their notes when they progress from simply reading the text to either studying, delving deep into the content they were reviewing or otherwise writing about it.

In some implementations, the system and methods of the present invention may be used in an educational or schooling environment. In such scenarios, the system and methods are configured to enable a teacher to use this tool to provide an assignment that includes a highlight and tag to students and have students apply it as they complete the assignment. The system and methods of the present invention permit teachers to assign tasks to students, e.g., to find the metaphors and similes in a particular chapter, and facilitates review by the teachers of students' submissions.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus, platform, or system architecture for performing the operations described. This apparatus, platform, or system architecture may be specially constructed for the required purposes, or it may comprise one or more general-purpose computers (in a distributed architecture or otherwise) selectively activated or reconfigured by one or more computer programs stored in the computers. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present technology may take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages, for example, high level programming languages such as "C," "Java," or "Pascal," may be used to implement the teachings of the technology as described herein. The computers may be specially programmed, and be configured with special purpose hardware. Each computer may have a single processor, a multiprocessor or may comprise multiple computers, each of which may include a single processor or a multiprocessor, operably connected over a computer network (one or more). Each computer may be controlled by one of a variety of operating systems including Microsoft Windows, Macintosh, Linux, Unix, or a Java-based operating system, to name a few.

Each computer in the system may include one or more input and output (I/O) units, a memory system, and one or more processing units. The input-output ("I/O") units of each computer may be connected to various input/output devices, such as a mouse, keyboard, video card (video monitor), sound card (with speakers), network card, and printer. The memory system in a typical, general purpose, computer system, which usually includes a computer readable and writeable nonvolatile recording medium, of which a magnetic disk, a flash memory and tape are some examples. The memory system operably holds the operating system, utilities, and application programs. It should also be understood that the invention is not limited to the particular input devices, output devices, or memory systems used in combination with the computer system or to those described herein. Nor should the invention be limited to any particular computer platform, processor, or high-level programming language.

Platform/System Architecture Overview

FIG. 1 illustrates a high-level block diagram of example system architecture for automatically attaching a tag and highlight in a single action, indicated generally by reference numeral 100. The system platform 100 may be configured with an application server 118 comprising an application 120, a content-management engine 122 and an assignment engine 124. A plurality of users 114a, 114b, through 114n may access the application server 118 via their user devices 106a, 106b, through 106n, respectively. Each of the user devices 106a, 106b, through 106n has a user application as indicated by reference numeral 108a in the user device 106a. One or more of the users 114a, 114b, through 114n may communicate with the application server 118 via their user devices 106a, 106b, through 106n, as illustrated by signal lines 112a, 112b, through 112n. The user application 108a may be a web browser or a mobile application. The user (114a-114n) may navigate to a web page via the user application 108a to view electronic content or read a particular book. The browser may be any one of Chrome, Safari, Firefox, Internet explorer or the like. The user devices 106a, 106b, through 106n are coupled to a network 102 via signal lines 104a, 104b, through 104n. The network 102 is coupled to the application server 118 via a signal line 116. The signal lines illustrated in this diagram are intended to illustrate flow of communication or interactions among the system components illustrated. The user devices 106a through 106n in FIG. 1 are illustrated as examples.

Although FIG. 1 illustrates only these three user devices, the present disclosure applies to any system architecture having one or more user devices 106 therefore any number of user devices 106 may be used. Furthermore, while only one network 102 is illustrated as coupled to the user devices 106a through 106n, and the application server 118, in practice, any number of networks 102 may be connected to these entities.

In some implementations, the network 102 may be of conventional type, wired or wireless, and may have any number of configurations such as a star configuration, token ring configuration or other configurations recognized by those skilled in the art. In some implementations, the network 102 may also represent use of mobile applications designed to operate on smartphones, tablet computers, and other mobile devices. The mobile applications may be available through application distribution platforms, operated by the owners of the mobile applications or others. These mobile applications may be downloaded from the distribution platforms to target devices. In some implementations, the network 102 may comprise a local area network (LAN), a wide area network (WAN) (e.g., the Internet), and/or any other interconnected data path across which multiple devices may communicate. In some implementations, the network 102 may be a peer-to-peer network. The network 102 may also be coupled to or include portions of a telecommunications network for sending data in a variety of different communication protocols. In yet other implementations, the network 102 may include Bluetooth communication networks or a cellular communications network for sending and receiving data such as via short messaging service (SMS), multimedia messaging service (MMS), hypertext transfer protocol (HTTP), direct data connection, WAP, email, etc.

The application server 118, which in some implementations serves as a content-management platform comprises the software routines and instructions to operate the system architecture 100 and its functions and operations. Although only one application server 118 is illustrated and described here, multiple servers may be present or used, each with functionality that is similar or different from one another.

FIG. 2 illustrates some implementations of the hardware architecture of the application server 118 with the hardware and software capabilities within some of the hardware components. In FIG. 2, like reference numerals have been used to reference like components with the same or similar functionality that has been described above with reference to FIG. 1. For the components that have been described above, the description is not repeated here. As illustrated in FIG. 2, the application server 118 includes a processor 202, a memory 204, data storage 210, a communication unit 208, a social graph (in a social network 212), an application 120, the content-management engine 122, and an assignment engine 124, all of which may be communicatively coupled to a system bus 206.

The processor 202 processes data signals and program instructions received from the memory 204 and the data storage 210. The processor 202 comprises an arithmetic logic unit, a microprocessor, a general or special purpose controller or some other processor array to perform computations and provide electronic display signals to a display device (e.g., on a user device 106a). The processor 202 is coupled to the bus 206 for communication with the other components. The processor 202 may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It will be obvious to one skilled in the art that other processors, operating systems, sensors, displays, and physical configurations than those that are illustrated may be used to perform the operations described in this specification.

The memory 204 may be a non-transitory storage medium. The memory 204 stores the instructions and/or data for operating the application server 118, which may be executed by the processor 202. In one implementation, the instructions and/or data stored in the memory 204 comprises code for performing any and/or all of the techniques or functionalities that are described in this specification. The memory 204 may be a dynamic random access memory (DRAM) device, a static random access memory (SRAM) device, flash memory or some other memory device known in the art.

The data storage 210 stores the data and program instructions that may be executed by the processor 202. In one implementation, the data storage 210 may store the data of various types of users in the web forum. The data storage 210 may include a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

The communication unit 208 facilitates the communication between the user device 106 (in FIG. 1) and the application server 118 over the network 102 (in FIG. 1). For example, a user 114a, via the user device 106a, may access the application server 118 to view or read electronic content and otherwise interact with the application server 118 (system platform 100) and receive information from the server application server 118 via the communication unit 208. The communication unit 208 also displays the content or information either received from or hosted on the server 118 to any of the users 114a through 114n.

The communication unit 208 couples the application server 118 to the network 102 by the signal line 116 (in FIG. 1) and via the bus 206. The communication unit 208 may include network interface modules, which include ports for wired connectivity such as but not limited to USB, SD, or CAT-5, etc. The network interface modules are configured to link the processor 202 to the network 102 that may in turn be coupled to other processing systems. The network 102 (FIG. 1) may comprise a local area network (LAN), a wide area network (WAN) (e.g., the Internet), and/or any other interconnected data path across which multiple devices may communicate. The network interface modules are configured to provide conventional connections to the network 102 using standard network protocols such as TCP/IP, HTTP, HTTPS and SMTP as well as any others that are understood to those skilled in the art. The network interface modules include a transceiver for sending and receiving signals using WIFI, Bluetooth® or cellular communications for wireless communication.

FIG. 2 also illustrates the social graph 212, which may relate to any or all of the users, 114a through 114n. The term "social graph" as used in this specification encompasses its plain and ordinary meaning including, but not limited to, a set of online relationships between users, such as provided by one or more social networking systems or platforms, such as the platform 100, including explicitly-defined relationships and relationships implied by social connections with other online users, where the relationships form a social graph. In some examples, the social graph 112 may reflect a mapping of these users and how they are related.

Figure 2A:
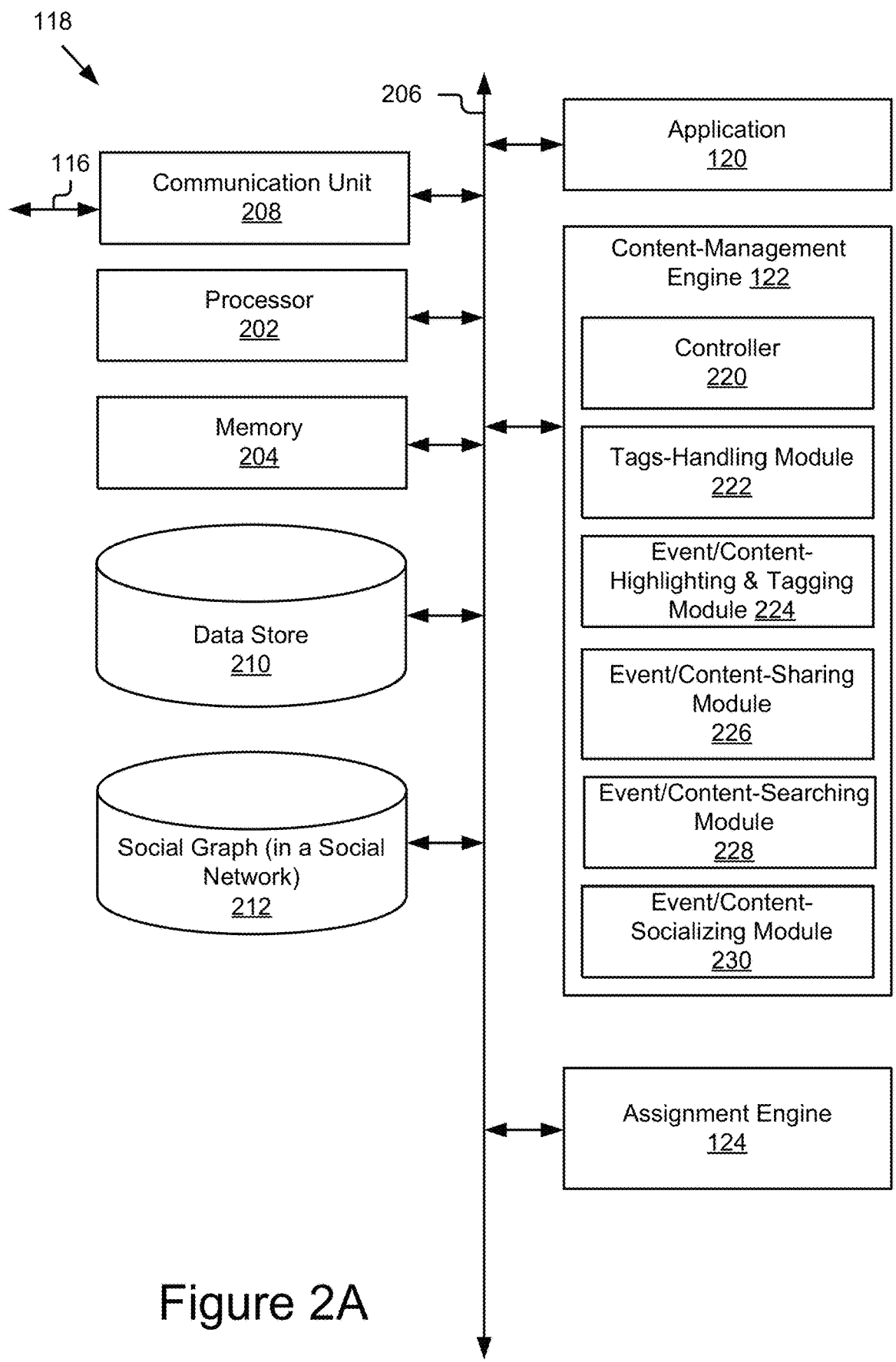
FIG. 2A is a block diagram of an example application server illustrated FIG. 1.

FIG. 2A also illustrates the application 120, the content-management engine 122, and the assignment engine 124. The content-management engine 122 includes a controller 220, a tag-handling module 222, a event/content-highlighting module 224, an event/content-sharing module 226, an event/content-searching module 228, and an event/content-socializing module 230. The content-management engine 122 is configured to create, insert, or place a tag and a highlight in a single action. The tag may include as examples a comment, link, poll query, or quiz. In particular, the tags-handling module 222 is configured to create, insert or place a tag on particular text. The event/content-highlighting module 224 is configured to highlight designated text as indicated (e.g., by a particular user). The event/content-sharing module 226 is configured to enable users or readers to share particular content with others (e.g., teachers with students etc.) The event/content-searching module 228 is configured to enable users to browse through "reading shelves" or lists compiled by other users to discover materials of interest to them. In some implementations, the event/content-searching module 226 may be configured to formulate and present tasks with respect to particular content with others via a network. These operations are performed by the invitation module 228. The event/content-socializing module 230 may be a mechanism by which particular content is shared with many parties, either via an "app" or through social media.

The assignment engine 124 is configured to facilitate assigning tasks or assignments by one user. As one example, a teacher may use this platform and functionality to create or assign (e.g., a task designated by another) an assignment and "push" a tag with the assignment to a restricted set of users (e.g., one or more groups of students or individual students). The tag is automatically visible to the students on their electronic devices. The teacher may receive answers to the assignment from the students, grade them, provide feedback to the students, or the like. The assignment module 230 may be configured to formulate one or more assignments as desired by the teacher. In other examples, an authority figure at an organization may also use this aspect. An assignment-management module 242 is configured to manage the assignments (either a single assignment or multiple, either related or unrelated).

Each of the modules and engines described above may include software or program instructions configured to perform the functionalities described below in the methods and operations described.

Figure 2B:
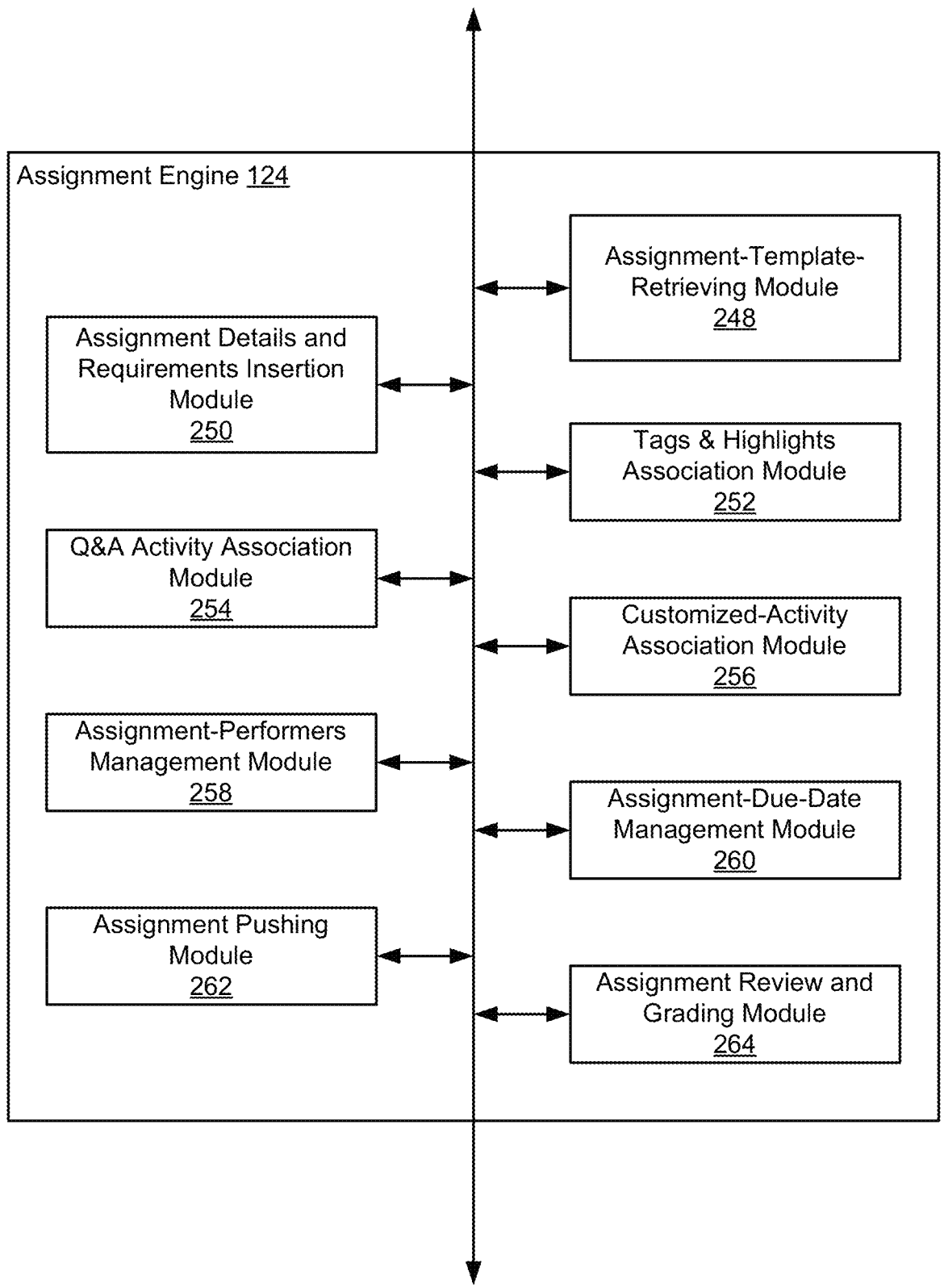
FIG. 2B is a block diagram illustrating the components of the Assignment Engine.

Referring now to FIG. 2B, example components of the assignment engine 124 are described. In some implementations, the assignment engine 124 may include an assignment-template-retrieving module 248 for retrieving one or more assignment templates from data storage, such as the data storage 210 illustrated in FIG. 7. The assignment engine 124 comprises an assignment details and requirements insertion module 250 for inserting details (e.g., assignment title, instructions, etc.) and requirements (e.g., standards, page range, etc.) for an assignment. The assignment engine 124 includes tags and highlights association module for associating or importing a first user's (e.g., teacher) tags & highlights associated with an event into an assignment. It is also used for associating a "Tag & Highlight Activity" to be performed by one or more second users (e.g., students) into the assignment. The assignment engine 124 includes a Q&A activity association module 254 for associating or importing a Q & A activity into an assignment. The Q & A activity requires one or more second users (e.g., students) to provide answer(s) to question(s) posed by a first user (e.g., teacher) in the assignment. The assignment engine 124 may include a customized-activity association module 256 for customizing an already created activity (e.g., Tag & Highlight Activity, Q & A activity) or for creating a new activity. The assignment engine 124 may include an assignment-performers management module 258 for managing one or more second users (e.g., students) for performing an assignment. In some implementations, the assignment engine may include an assignment-due-date management module 260 for managing a due date for an assignment. The assignment engine may include an assignment pushing module 262 for pushing/sending an assignment from a first user (e.g., teacher) to one or more second users (e.g., students) for completion by a due date. In some implementations, the assignment engine 124 may include an assignment review and grading module 264 for reviewing and grading an assignment completed by one or more second users (e.g., students).

It should be recognized that some implementations may designed or configured without any of the modules indicated above or configured in different ways. The description here is by way of example. Each of the modules described above may include software or program instructions configured to perform the functionalities described above with respect to each module and below in the methods and operations described.

Figure 3A:
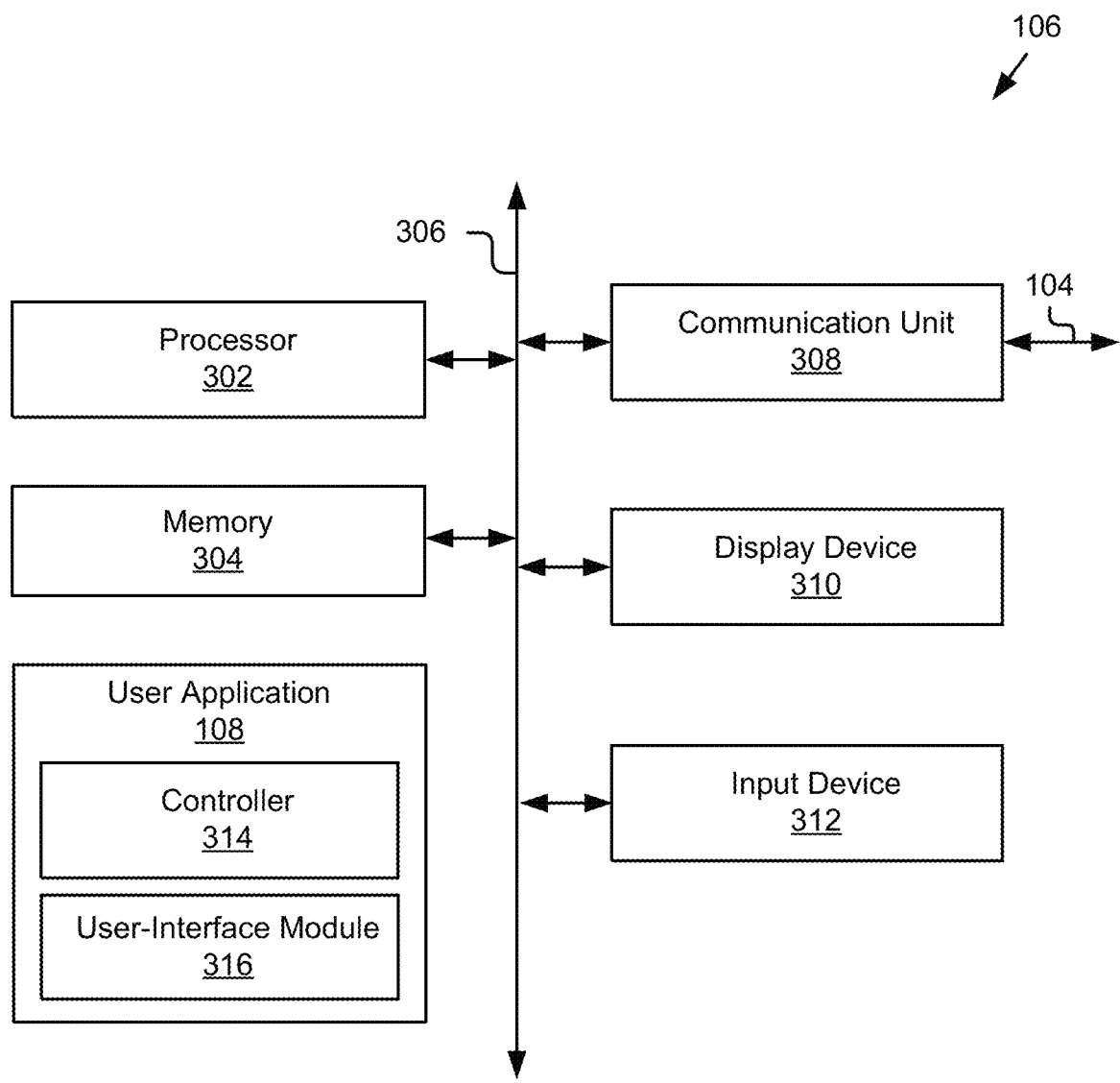
FIG. 3A is a block diagram of an example user device on which a user may view electronic content (e.g., digital book, electronic publication or document in a portable document format).

Referring now to FIG. 3A, an example implementation of the user device 106 is illustrated. The user devices 106a through 106n can be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network. The user device 106 includes a processor 302, memory 304, a communication unit 308, a display device 310, an input device 312, and the user application 108 including a controller 314 and a user-interface module 316 configured to facilitate interactions with the application server 118.

The processor 302 processes data signals and program instructions received from the memory 304. The processor 302 comprises an arithmetic logic unit, a microprocessor, a general or special purpose controller or some other processor array to perform computations and provide electronic display signals to the display device 310 (e.g., on a user device 106a). The processor 302 is coupled to the bus 306 for communication with the other components. The processor 302 may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. It will be obvious to one skilled in the art that other processors, operating systems, sensors, displays, and physical configurations than those that are illustrated may be used to perform the operations described in this specification.

The memory 304 may be a non-transitory storage medium. The memory 304 stores the instructions and/or data for operating the user application 108, which may be executed by the processor 302. In one implementation, the instructions and/or data stored in the memory 304 comprises code for performing any and/or all of the techniques or functionalities that are described in this specification. The memory 304 may be a dynamic random access memory (DRAM) device, a static random access memory (SRAM) device, flash memory or some other memory device known in the art. The user application 108 includes a controller 314 and a user-interface module 316.

The communication unit 308 is hardware and software for implementing communications via signal lines 104, via the network with an application server 118. A display device 310 facilitates viewing of content for the user 114 on the user device 106. The input device 312 receives input from users 114 (a-n).

Figure 3B:
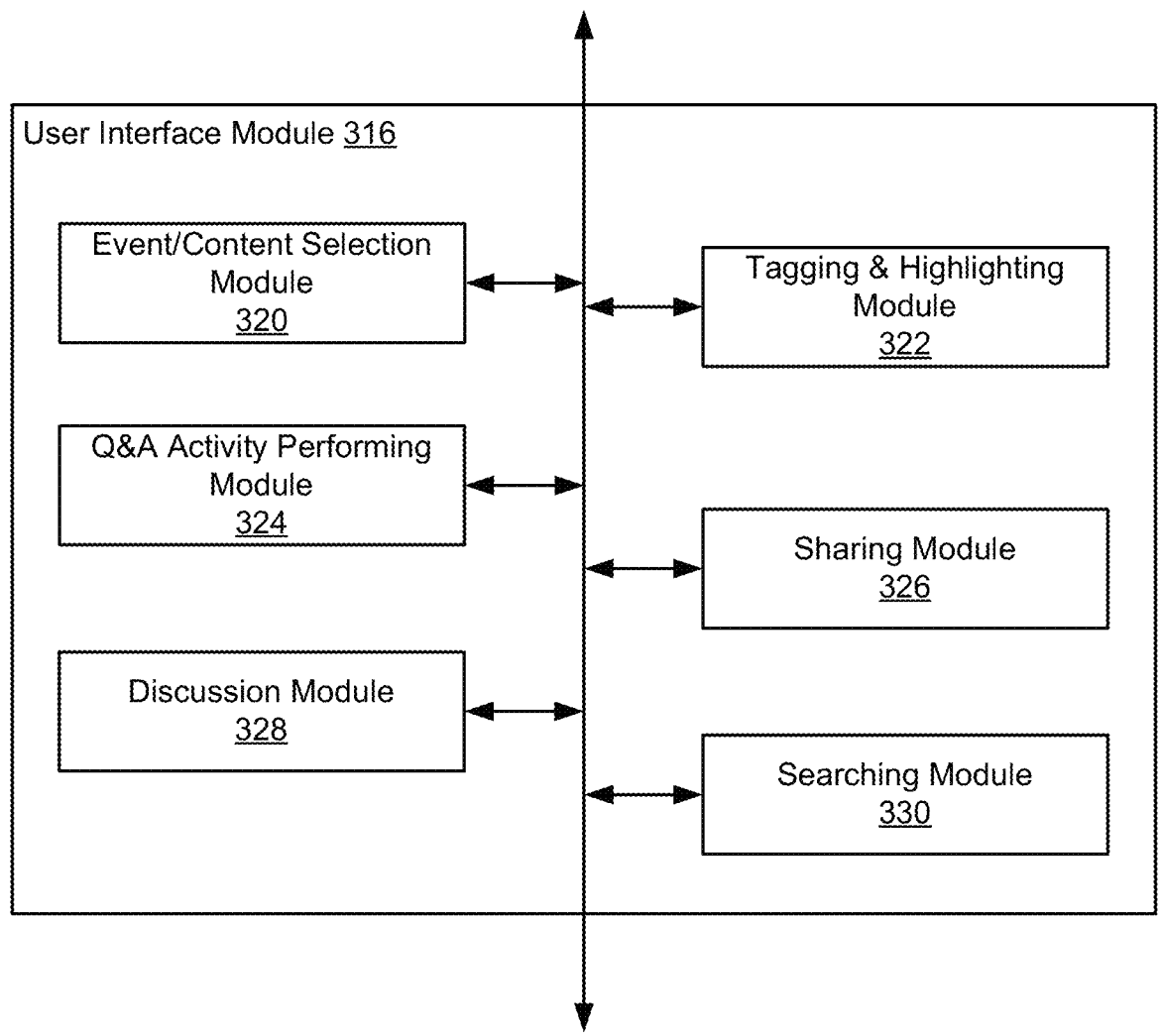
FIG. 3B is a block diagram illustrating the components of the user interface module 316 illustrated in FIG. 3A.

FIG. 3B illustrates example components of the user interface module 316. The user interface module 316 is configured to include an event/content selection module 320 for selecting a particular event (e.g., a certain portion of an electronic book or assignment) for performing one or more activities (e.g., highlighting and tagging, question and answer, sharing, discussion, searching, etc.). The user interface module 316 may also include a tagging and highlighting module 322, a Q & A activity performing module 324, a sharing module 326, a discussion module 328, and a searching module 330. The tagging and highlighting module 322 is configured for highlighting and tagging a particular event or content of an assignment (or for an assignment). The Q & A activity performing module 324 is configured for performing a Q & A activity assigned by a first user (e.g., a teacher) in an assignment. The Q & A activity may include, for example, answering a specific question asked by the teacher in an assignment. The sharing module 326 is configured for sharing a particular event (including highlight(s) and tag(s)) with one or more other user groups. The discussion module 328 is configured for discussing a particular event (including highlight(s) and tag(s)) on a search engine (e.g., yahoo) for one or more search results related to the event.

Each of the modules described above may include software or program instructions configured to perform the functionalities described above with respect to each module and below in the methods and operations described.

Methods/Operations Overview

FIGS. 4 through 6C illustrate various flow charts of the methods and/or operations that may be performed by or on the platform 100 by the application server 118. It should be understood that the order of the operations illustrated is by way of example. This order may be changed or certain operations may be eliminated. In addition, the "START" and "END" designations in each of the flow charts are merely for designating when the illustrated group of operations (formulated as a routine or subroutine) either begins or ends. This should not be construed as a beginning or end of the entire system operations.

Figure 4A:
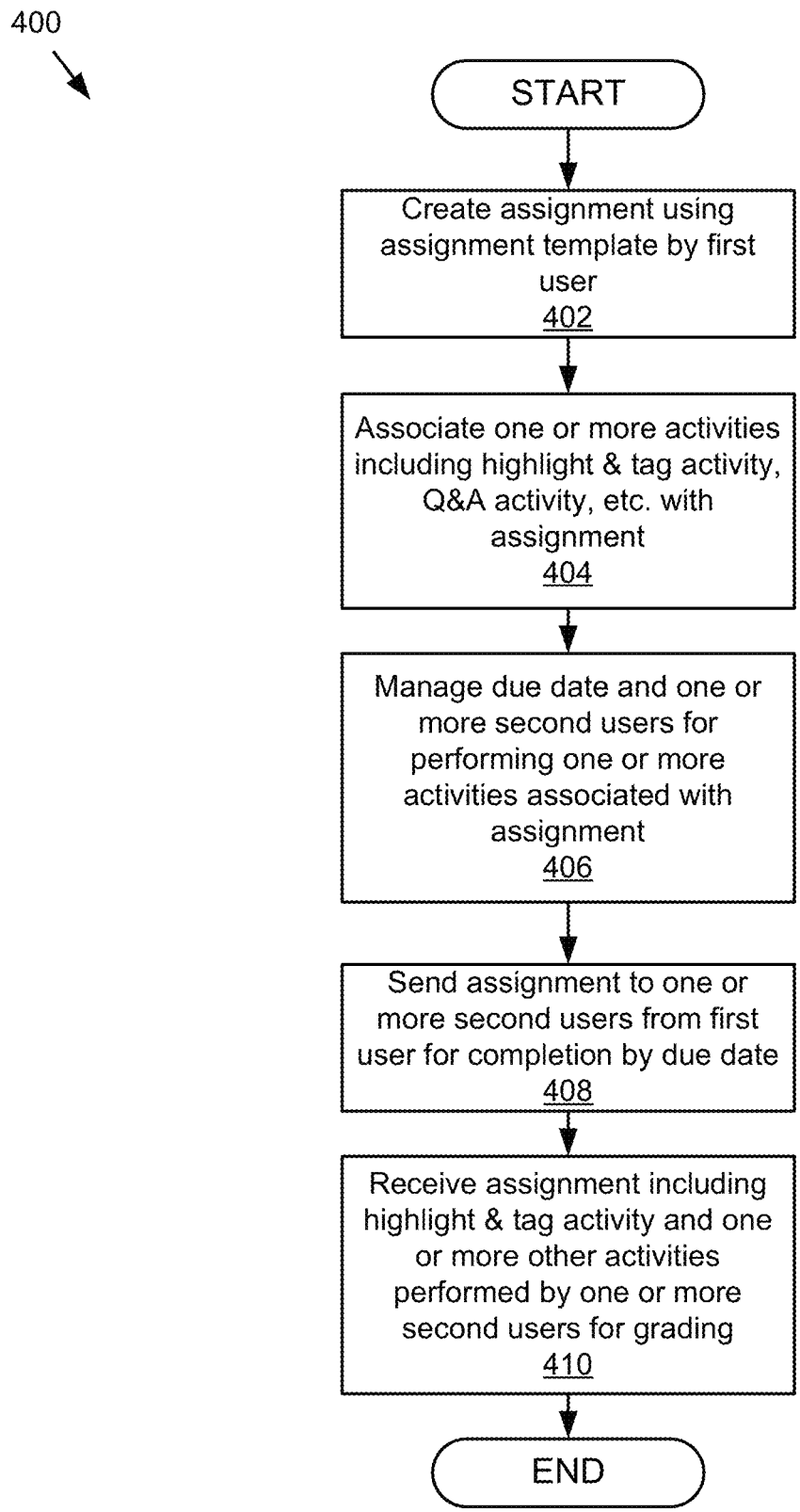
FIG. 4A is a flow chart illustrating an example method for creating an assignment by a first user and sending the assignment to one or more second users for completion.

Referring now to FIG. 4A, the methods and operations indicated generally by reference numeral 400 begin and proceed to block 402, including one or more operations for creating an assignment using an assignment template by a first user, for example, relating to particular content. From there, the methods and operations 400 proceed to the block 404 including one or more operations for associating one or more activities including a tag and highlight activity (in a single action), question and answer (Q & A) activity, etc., with the particular assignment that is designated. The method 400 proceeds to the next block 406, including one or more operations configured to manage due date indications and one or more second (or other) users for performing one or more activities either associated with or defined for the assignment. The method 400 proceeds to the next block 408, including one or more operations for sending the assignment to one or more second (or other) users from the first user for completion by the due dates that are designated or specified for the assignment. The method 400 proceeds to the next block 410 including one or more operations for receiving an assignment including one or more activities performed by one or more second (or other) users for grading.

Figure 4B:
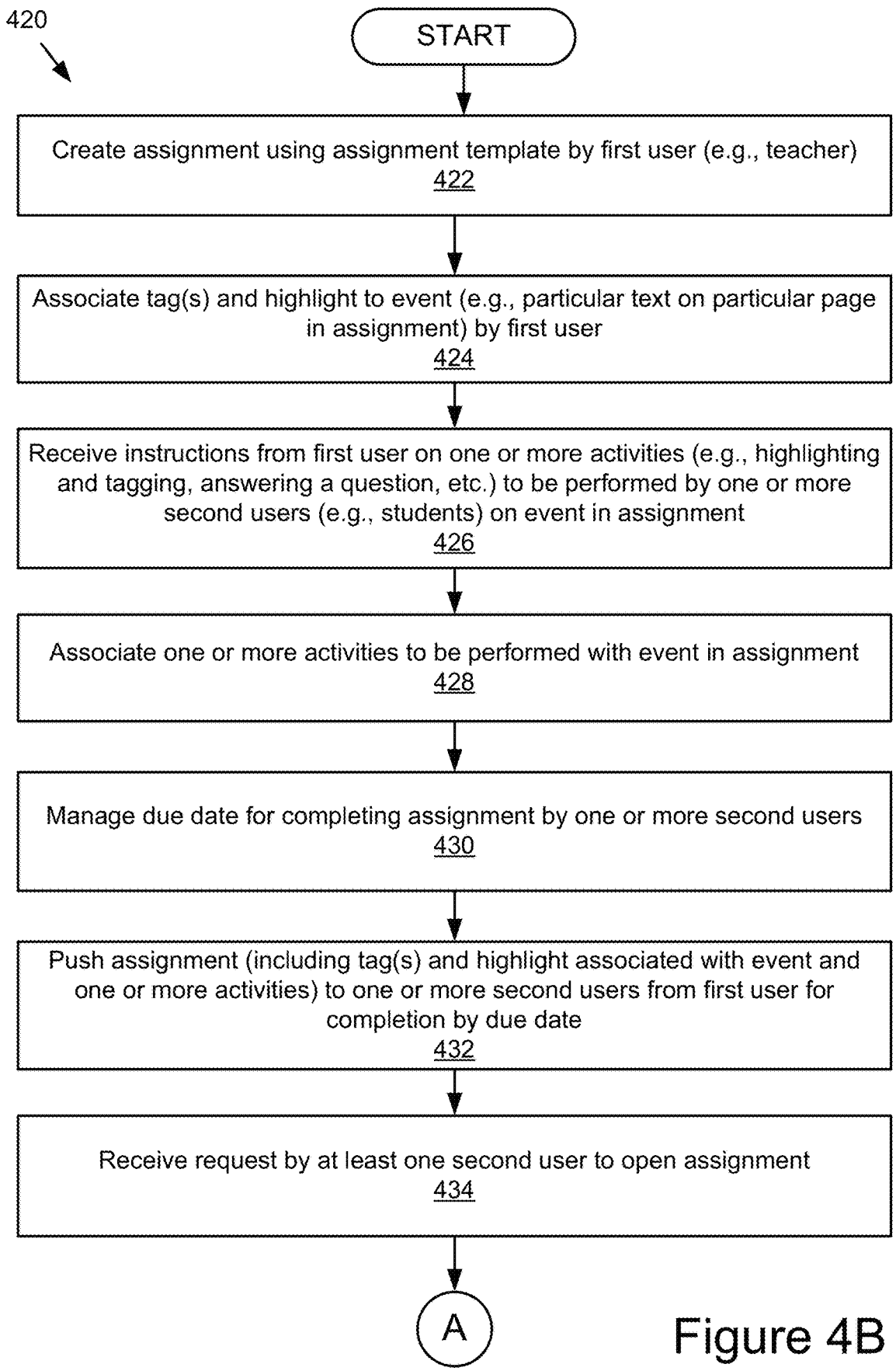
FIGS. 4B and 4C are flowcharts of an example method for pushing an assignment (including tag(s) and highlights associated with an event) from a first user (e.g., teacher) to one or more second users (e.g., students) for completion by a due date.
Figure 4C:
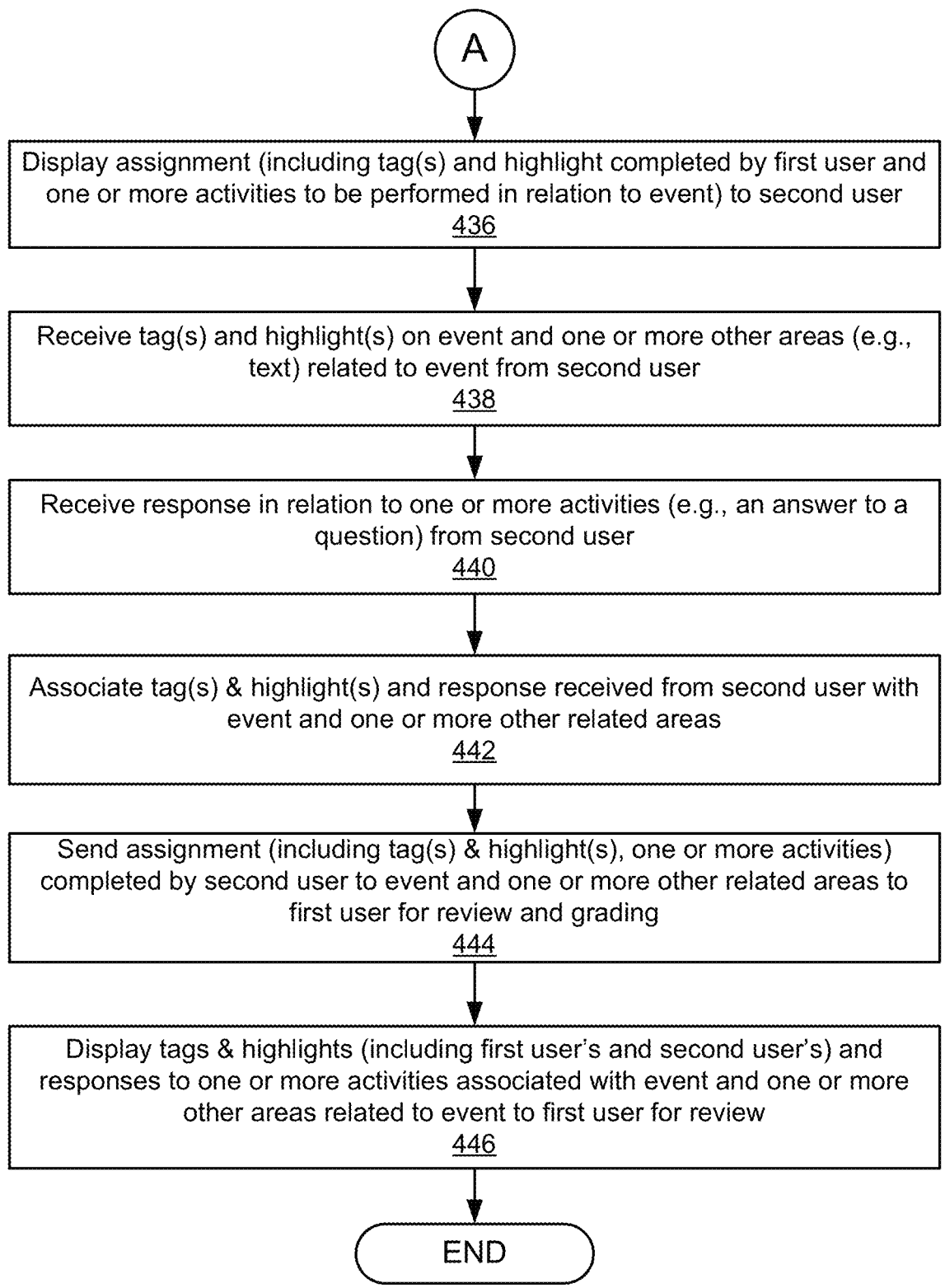

FIGS. 4B and 4C are flowcharts of an example method 420 for pushing an assignment including tag(s) and highlight associated with a particular portion/text/content of the assignment (the particular portion/text/content of the assignment is herein interchangeably referred to sometimes as an "event") from a first user (e.g., teacher) to one or more second users (e.g., students) for completion by a due date. Referring now to FIG. 4B, the method 420 begins and proceeds to the block 422 including one or more operations for creating an assignment using an assignment template by a first user (e.g., teacher). The method 420 proceeds to the next block 424, including one or more operations for associating tag(s) and highlight to an event by the first user. The method 420 proceeds to the next block 426 including one or more operations for receiving instructions from the first user on one or more activities (e.g., highlighting and tagging, answering a question, etc.) to be performed by one or more second users (e.g., students) on event in the assignment. The method 420 proceeds to the next block 428 including one or more operations for associating one or more activities to be performed with an event in the assignment. The method 420 proceeds to the next block 430 including one or more operations for managing a due date for completing an assignment by one or more second users. As one example, the second users may be one or more groups of students. The method 420 proceeds to the next block of operations 432 including one or more operations for pushing an assignment (including tag(s) and highlight associated with an event and one or more activities) to one or more second users from the first user for completion by the due date. In this platform, the teacher may "push" or send the tag through the assignment to other users (e.g. students). By way of example, a teacher may create a tag named "evidence" and associate that tag with a particular text in an assignment on a certain page range. Continuing this example, when a first student opens up the assignment and navigate to that page range, he/she will be automatically shown the "evidence" tag that is tagged by the teacher and can also be able to include one or more of his/her own tags with the same text in the assignment, as shown in FIG. 18. Yet continuing the above example, when a second student opens up the same assignment and navigate to the same page range, he/she will be automatically shown the "evidence" tag that is tagged by the teacher, the one or more tags set by the first student, and the second student can also be able to include one or more of his/her own tags with the same text in the assignment like the first student. Once each of the first and the second student finishes and submits the assignment to the teacher, the teacher can be able to drill down on each student and see what they highlighted and tagged in correspondence with the tag "evidence".

The method 420 proceeds to the next block 434 including one or more operations for receiving a request by at least one second user to open the assignment. The method 420 proceeds to a connector "A" and via this connector to block 436 in FIG. 4C. The block 436 executes one or more operations for displaying the assignment (including tag(s) and highlight placed by the first user and one or more activities to be performed in relation to the event) to the second user. In one example, when the other users or students open the assigned book to the assigned page range, their highlight menu will automatically show the tag set by the first user, such as a tag "event". The method 420 proceeds to the next block 438 including one or more operations for receiving tag(s) and highlight(s) on the event and one or more other areas (e.g. text) related to the event from the second user. In some implementations, after the student tags text with "event", the highlighted sections of text will show up in the assignment. As an example, in the event a teacher has instructed student groups to identify similes and metaphors in a particular section of a digital book (within particular pages), the student may highlight and tag these and provide these back to the teacher.

The method 420 proceeds to the next block 440 including one or more operations for receiving responses in relation to the one or more activities (e.g., an answer to a question) from the second user. The method 420 proceeds to the next block 442 including one or more operations for associating tag(s) and highlight(s) and response received from the second user with event and one or more other related areas. The method 420 proceeds to the next block 444 including one or more operations for sending the assignment (including the tag(s) and highlight(s)), one or more activities) placed by the second user at the event and one or more other related areas to the first user for review and grading. In one example scenario, once the student finishes and submits the assignment, the teacher can then be able to drill down on each student and see what they highlighted with the tag "event". The method 420 finally proceeds to the last block 446 including one or more operations for displaying tags and highlights (including first user's and second user's) and responses to one or more activities associated with the event and one or more other areas related to the event to the first user for review.

Figure 5A:
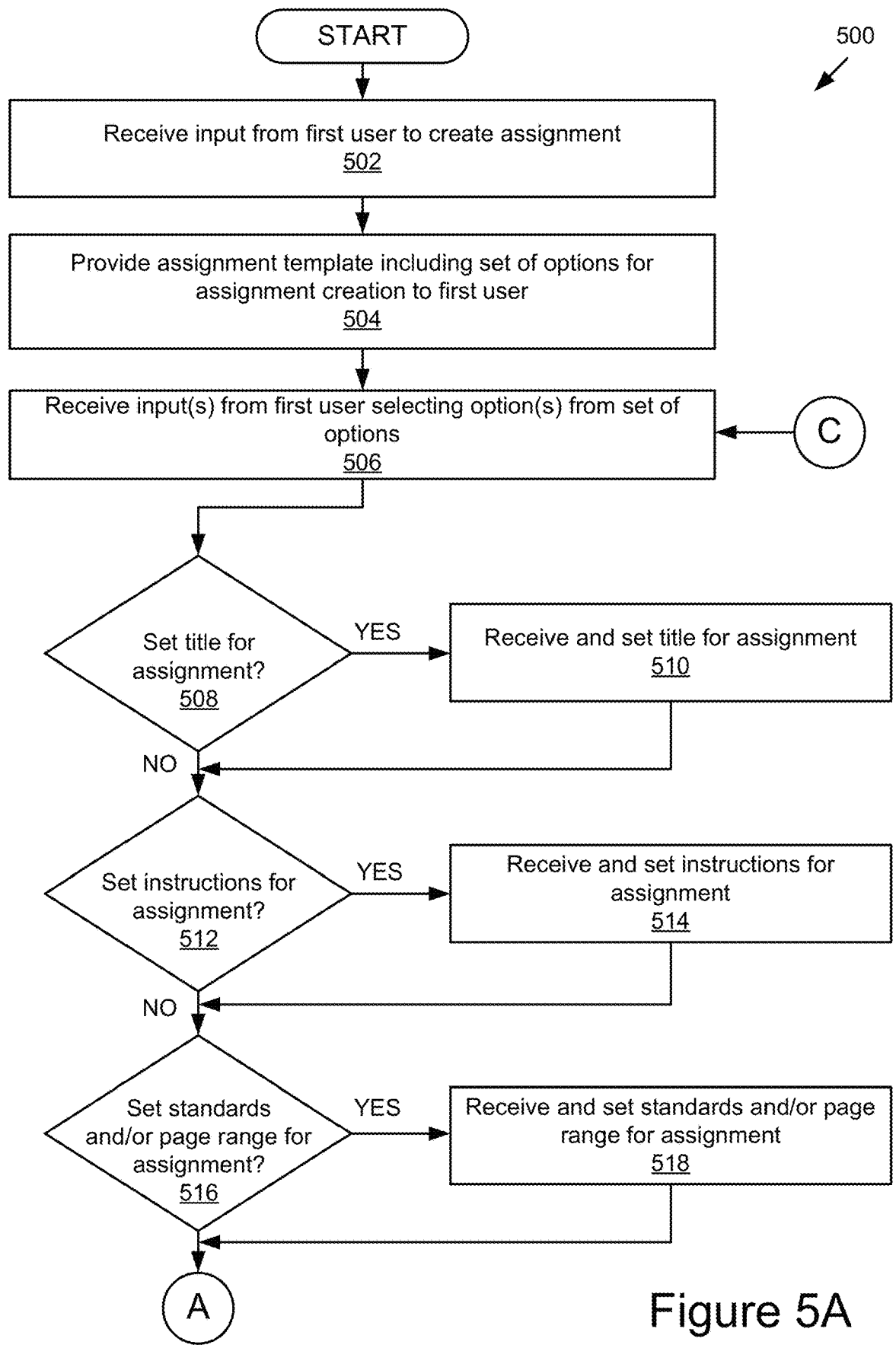
FIGS. 5A-5C together illustrate a continuous flowchart of a specific method illustrating an overall process for creating an assignment by a user, including the use of the tag and highlight operation in a single action or activity.

Referring now to FIG. 5A, in some implementations, the methods and operations indicated generally by reference numeral 500, begin and proceed to block 502, including one or more operations for receiving input from the first user (e.g., 106a or any one user through 106n) to create an assignment. From there, the methods and operations 500 proceed to the next block 504, which represents one or more operations for providing an assignment template (e.g. from a menu of templates) to a first user (e.g., 106a) including a set (one or more) of options for creation of an assignment to a first user (e.g., 106a). The methods and operations 500 proceed to the next block 506, including one or more operations for receiving input(s) from the first user selecting a particular option or options from a set of options. A connector "C" also connects to the block 506. The methods and operations 500 proceed to the next decision block 508 including one or more operations for determining if the user wants to set a title for the assignment. If the answer is affirmative, the method 500 proceeds to the next block 510 including one or more operations for receiving and setting a title or such designator for the assignment. The method 500 includes one or more operations for proceeding to the next decision block 512. If the answer at decision block 508 is negative, the method 500 proceeds to the next decision block 512, which includes one or more operations for presenting a query to determine if instructions for the assignment are to be set or designated. If the answer at decision block 512 is affirmative, the method 500 proceeds to the next block 514 including one or more operations for receiving and setting instructions for the assignment 514. From there, the method 500 proceeds to the next decision block 516. If the answer at the decision block 512 is negative, the method 500 proceeds to the next decision block 516 including one or more operations for setting standards and/or a page range for the assignment. As an example, the assignment may require students to search or identify particular figures of speech within the range of pages specified. If the answer at decision block 516 is affirmative, the method 500 proceeds to the next block 518 including one or more operations for receiving and setting standards and/or a page range for the assignment (e.g., a teacher may designate a task for a particular set of pages in a book). From there, the methods and operations 500 proceed via a connector "A" to block 520 in FIG. 5B. Returning to block 516, if the answer is negative, the method 500 proceeds via connector "A" to block 520 in FIG. 5B.

Figure 5B:
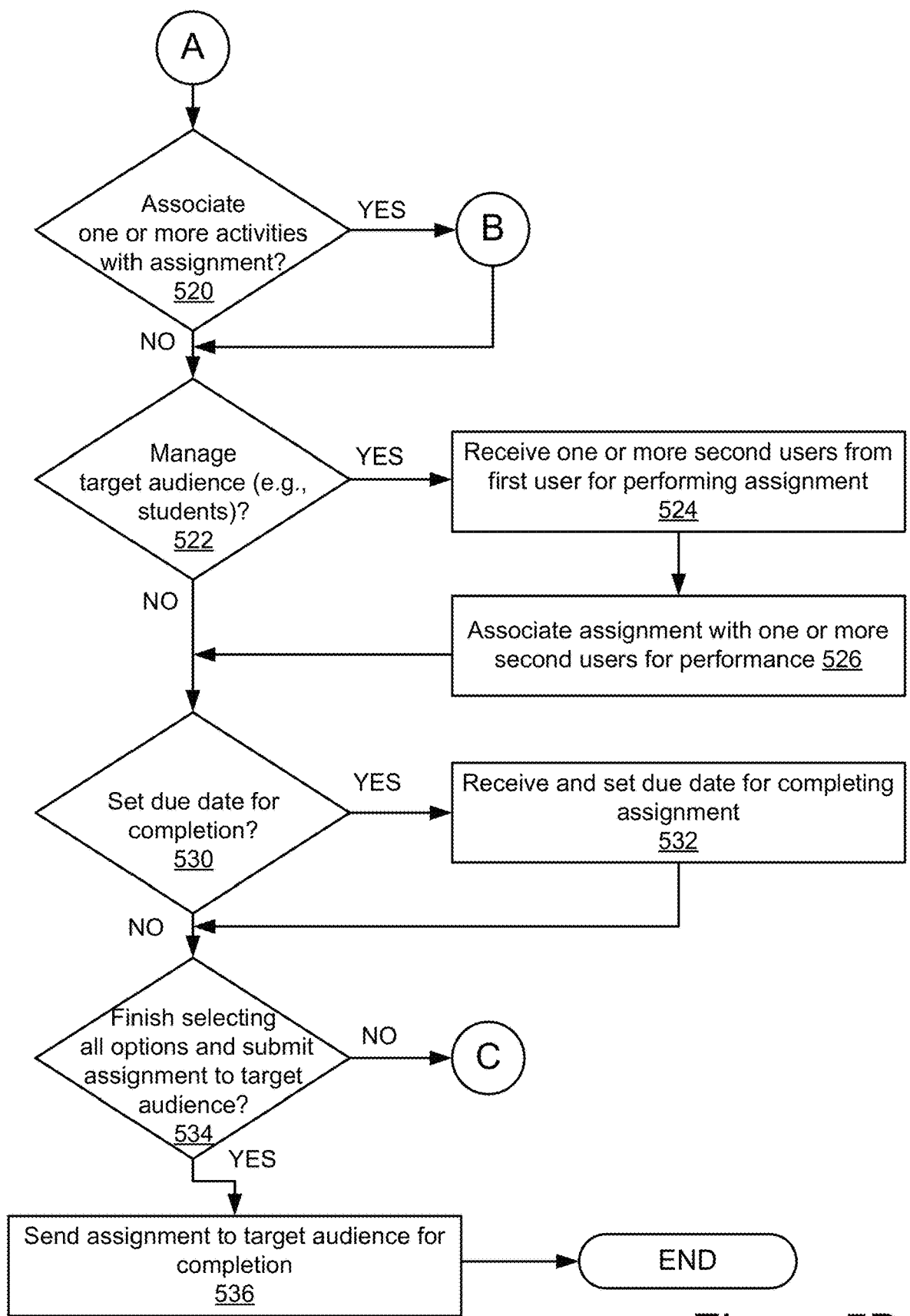

Referring now to FIG. 5B, the method 500 proceeds via connector "A" to a decision block 520 including one or more operations for associating one or more activities with the assignment. If the answer is affirmative, the method 500 proceeds to a connector "B" and on to operations described in FIG. 5C and then returns to the next decision block 522. If the answer at decision block 520 is negative, the method 500 proceeds to the next decision block 522, including one or more operations to make a determination if the target audience (of tasks) are to be managed. If the answer at the decision block 522 is negative, the method proceeds to the next block 524 including one or more operations for receiving designations of one or more second (and other) users from a first user for performing the assignment. The method 500 proceeds to the next block 526 including one or more operations for associating an assignment with one or more second users for performance of the assignment. The method 500 proceeds to the next decision block 530. If the determination at the decision block 22 is negative, the method 500 proceeds to the next decision block 530. At the decision block 530, if the determination is affirmative, the method 500 proceeds to the next block 532 including one or more operations for receiving and setting due dates for completing assignments. From block 532, the method 500 proceeds to the next decision block of operations 534. Returning to the decision block 530, if the answer is negative, the method 500 proceeds to decision block 534, including one or more operations for determining if the person or entity assigning the task has finished selecting all the options and submits the assignment to the target audience. If the determination at decision block 534 is negative, the method 500 proceeds to a connector "C" (FIG. 6A). If the determination at the decision block 534 is affirmative, the method 500 proceeds to the next block 536 including one or more operations for sending the assignment to the target audience for completion. The method 500 proceeds to an end.

Figure 5C:
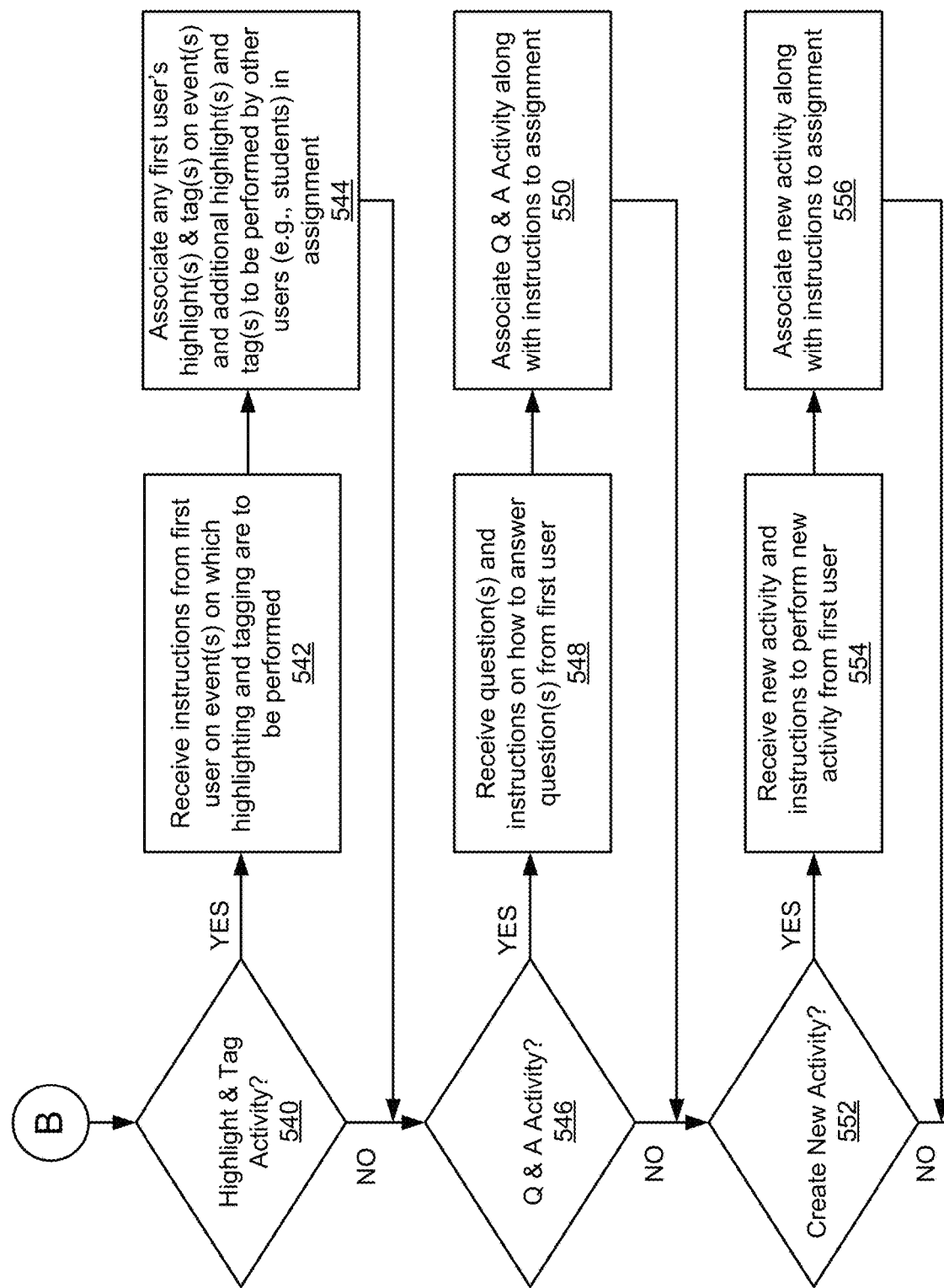
Figure 6A:
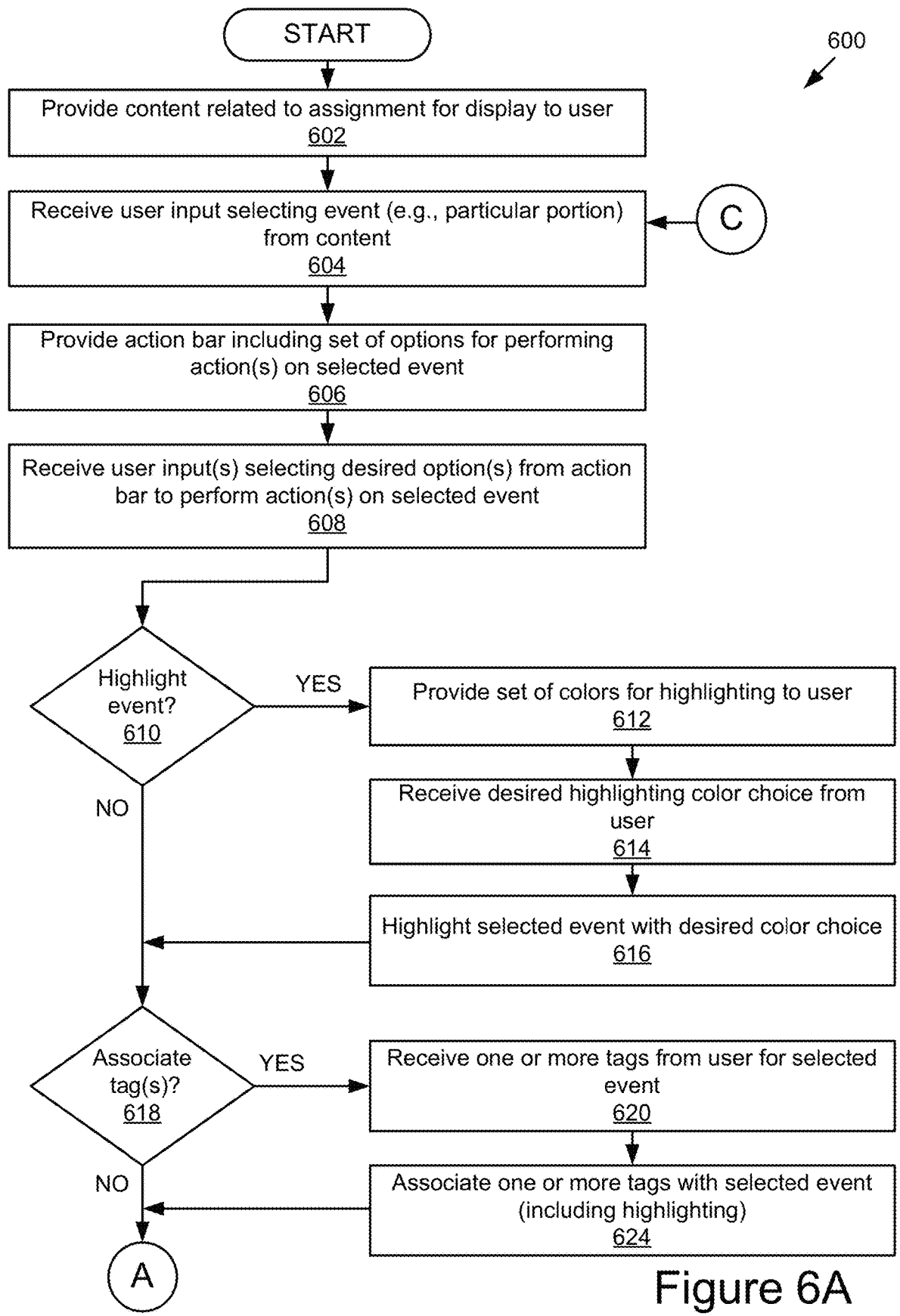
FIGS. 6A-6C illustrate a flowchart of a specific method for performing one or more actions or activities with respect to an assignment.

Referring now to FIG. 5C, from connector "B," the method 500 proceeds to the next decision block 540 including one or more operations for determining a highlight and tag activity. If the determination at the decision block 540 is affirmative, the method 500 proceeds to the next block 542 including one or more operations for receiving instructions from a first user on event(s) or content on which highlighting and tagging are to be performed. The method 500 proceeds to the next block 544 including one or more operations for associating any first user's highlight(s) and tag(s) on events and additional highlight(s) and tag(s) to be performed or performed by other users (e.g., students) in the assignment. The method 500 proceeds to the next decision block 546 including one or more operations for determining question and answer (Q & A) activity. If the answer is affirmative, the process 500 proceeds to the next block 548 including one or more operations for receiving question(s) and instructions on how to answer one or more questions from the first user. The method 500 proceeds to the next block 550 including one or more operations for associating Q & A activity along with instructions to the assignment. The method 500 proceeds to the next decision block 552 including one or more operations for determining if a new activity is to be created. Returning to block 546, if the answer or determination is negative, the method 500 proceeds to block 552 including one or more operations for determining if a new activity is to be created. The method 500 proceeds to the next block 554 including one or more operations for receiving a new activity and instructions to perform the new activity from the user. The method 500 proceeds to the next block 556 including one or more operations for associating the new activity along with instructions to the assignment. The method 500 proceeds to a point to join a negative determination from the decision block 552.

Referring now to FIG. 6A, the method and operations indicated generally by reference numeral 600 begin at block 602, including one or more operations for providing content related to an assignment for display to a user. The method 600 proceeds to the next block 604 including one or more operations for receiving user input to select a particular event (e.g., particular portion or portions) from the content. The method 600 also accomplishes further processing after connector "C." The method 600 proceeds to block 606 including one or more operations for providing an action bar including a set of options for performing action(s) on the selected event or portion. The method 600 proceeds to the next block 608 including one or more operations for receiving user input for selecting the desired options from the action in order to perform actions on the selected event or portion. The method 600 proceeds to the next decision block 610 including one or more operations for making a determination if a user wants to highlight a portion of the content or event. If the answer at block 610 is affirmative, the method 600 proceeds to the next block 612 including one or more operations or providing a set or palette of colors for highlighting to the user. The method 600 proceeds to the next block 614 including one or more operations for receiving desired color choices rom a user (e.g., user 106a). The method 600 proceeds to the next block 616 including one or more operations for highlighting selected events or portions with the desired color choices. The method 600 proceeds to the next decision block 618 for making a determination on whether to associate a tag(s). If the answer is affirmative, the method 600 proceeds to the next block 620 including one or more operations for receiving one or more tags from the user for the selected portion or event. The method 600 continues to block 624 including one or more operations for associating one or more tags with the selected portion or event (including the highlighting). If the answer at the decision block 618 is negative, the method 600 proceeds to the connector "A."

Figure 6B:
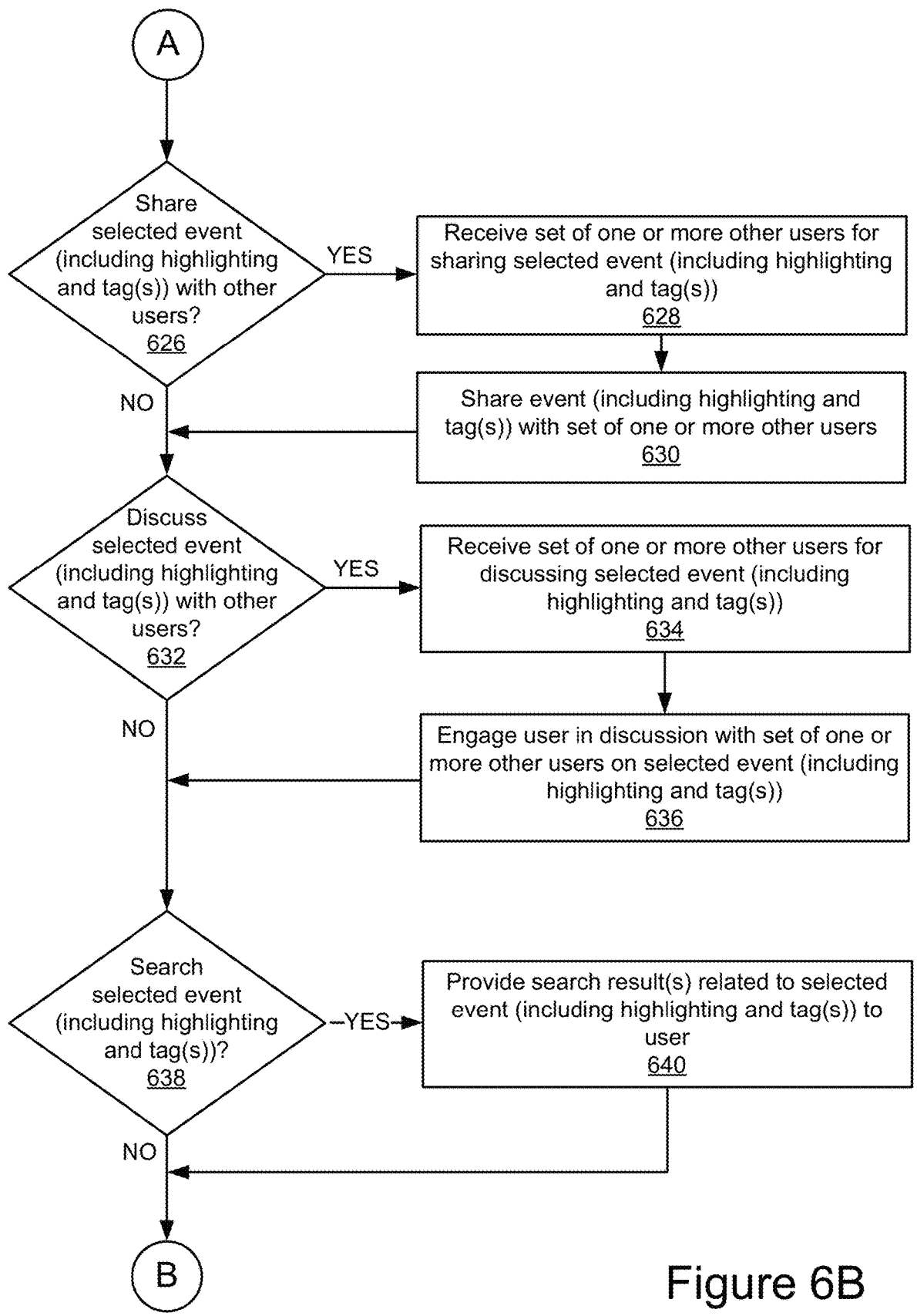

Referring now to FIG. 6B, from connector "A," the method 600 proceeds to a decision block 626, including one or more operations for sharing selected events or portions (including highlighting and tag(s)) with other users. If the determination yields an affirmative result, the method 600 proceeds to a block 628 including one or more operations for receiving a set of one or more other users or sharing selected events or portions (including highlighting and tag(s). The method 600 proceeds to the next block 630 including one or more operations for sharing one or more events or portions (including highlighting and tag(s) with a set of one or more users. The method 600 proceeds to a decision block 632 including one or more operations or discussing the selected event or portion (including highlighting and tag(s)) with other users. Returning to decision block 626, if the determination yields a negative result, the method 600 proceeds to the decision block 632. At the decision block 632, if the determination is affirmative, the method 600 proceeds to the next block 634 including one or more operations for receiving a set of one or more users or discussing selected events or portions (including the highlighting and tag(s)). The method 600 proceeds to the next block 636 including one or more operations for engaging a user in a discussion with a set of one or more other users on selected events or portions (including highlighting and tag(s)). The method 600 proceeds to the next decision block 638 including one or more operations for searching selected events or portions (including highlighting and tag(s)). The method 600 proceeds to the next block 640 including one or more operations for providing search result(s) related to selected event(s) or portion (s) (including highlighting and tag(s)) to the user. The method 600 proceeds to connector "B" and via it decision block 642 in FIG. 6C.

Figure 6C:
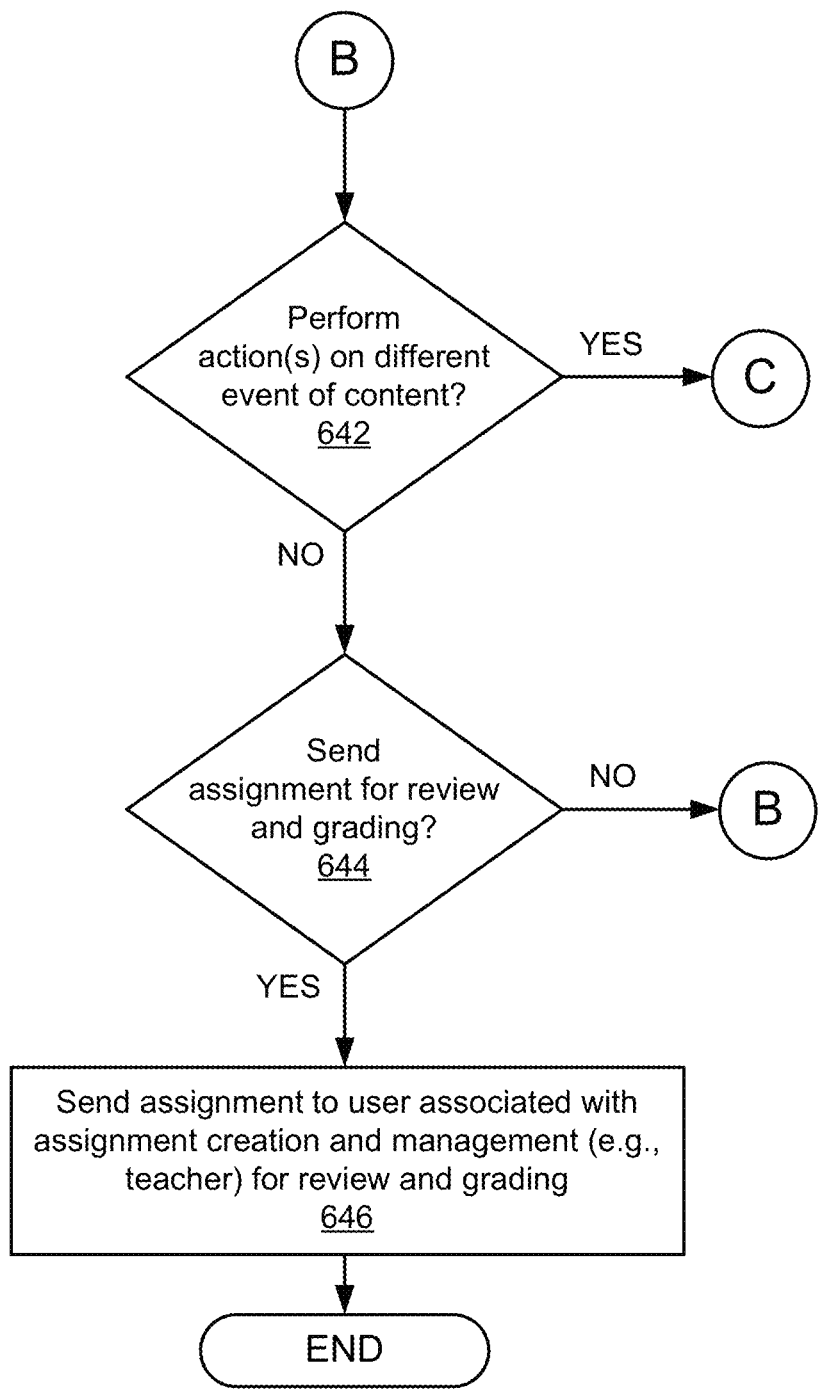

Referring now to FIG. 6C, the method 600, at decision block 642 includes one or more operations for performing action(s) on different portions of content. If this determination yields an affirmative, the method 600 proceeds to a connector "C." If the decision block 642 results in a negative determination, the method 600 proceeds to the next decision block 644 including one or more operations for sending an assignment for review and grading. If the answer is negative, the method 600 proceeds to connector "B," and via connector "B" returns to the decision block 642. The method 600 proceeds from the decision block 644 to the next block 646 including one or more operations for sending an assignment to the user associated with the assignment creation for review and grading. The method 600 proceeds to the end of this set of operations.

Figure 7:
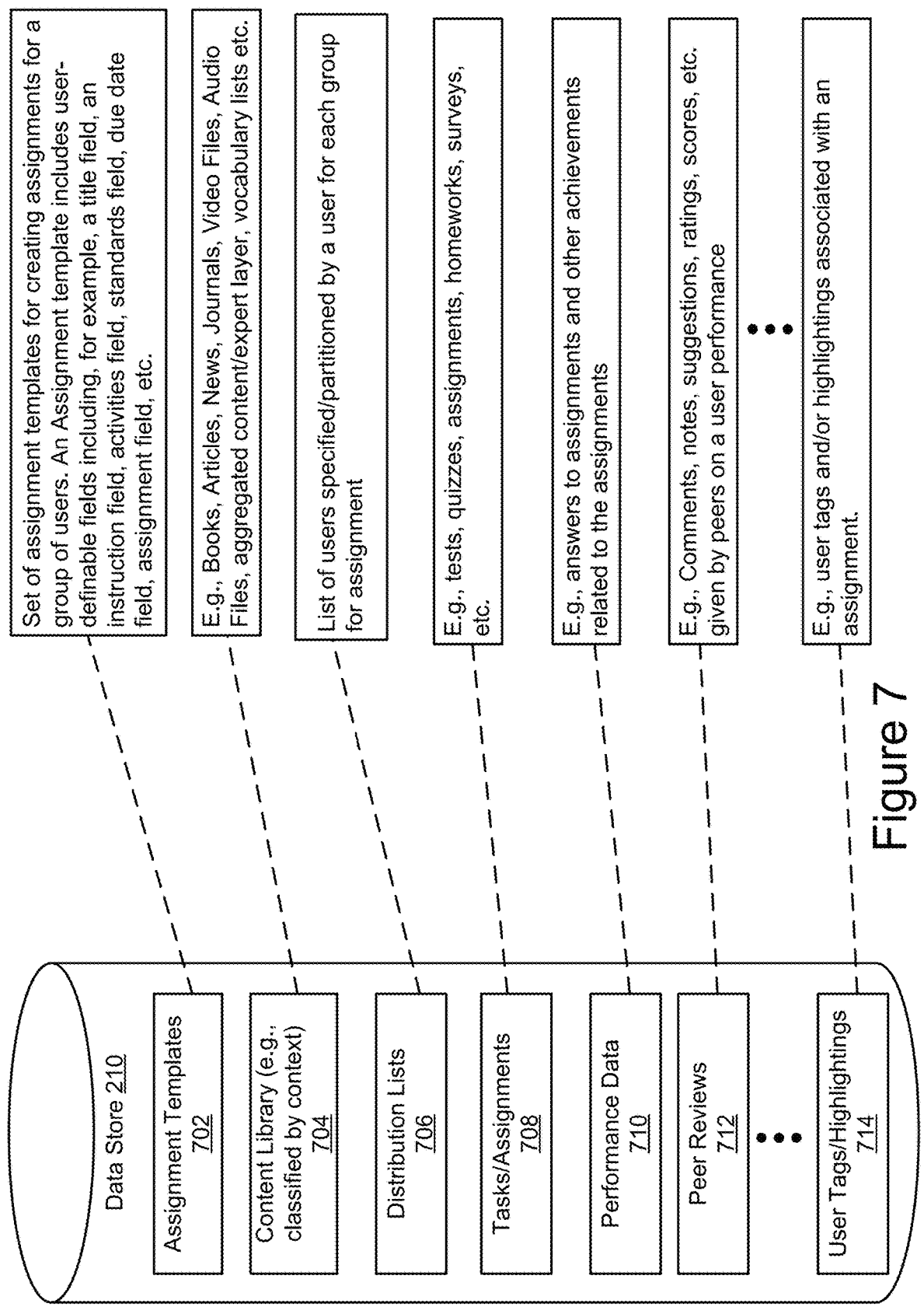
FIG. 7 illustrates a diagram of an example data storage provided within the application server or otherwise associated with it (in a distributed architecture) illustrated in FIG. 1.

FIG. 7 illustrates an example data storage 210 including data storage units or sections of memory configured to store the required data. The data storage as illustrated includes an assignment templates section 720 including a set of assignment templates for creating assignments or a group of users. An assignment template includes user-definable fields including, for example, a title field, an instruction field, activities field, standards field, due date field, assignment field etc. The data storage 210 includes a content library (e.g., classified by context), which may include for example, books, articles, news, journals, video files, audio files, aggregated content/expert layer, vocabulary lists etc. The data storage 210 is also configured to store distribution lists 706, tasks/assignments 708, performance data 710, peer reviews 712, and user tags and high lightings 714. Examples of distribution lists 706 include list of users specified/partitioned by a user for each group for assignment. Examples of tasks/Assignments 708 include tests, quizzes, assignments, homework, surveys etc. Examples of performance data include answers to assignments and other achievements related to the assignments. Examples of peer reviews include comments, notes, suggestions, ratings, scores, etc., given by peers on a user performance. Examples of User tags/high lightings include user tags and high lightings associated with an assignment.

Figure 8:
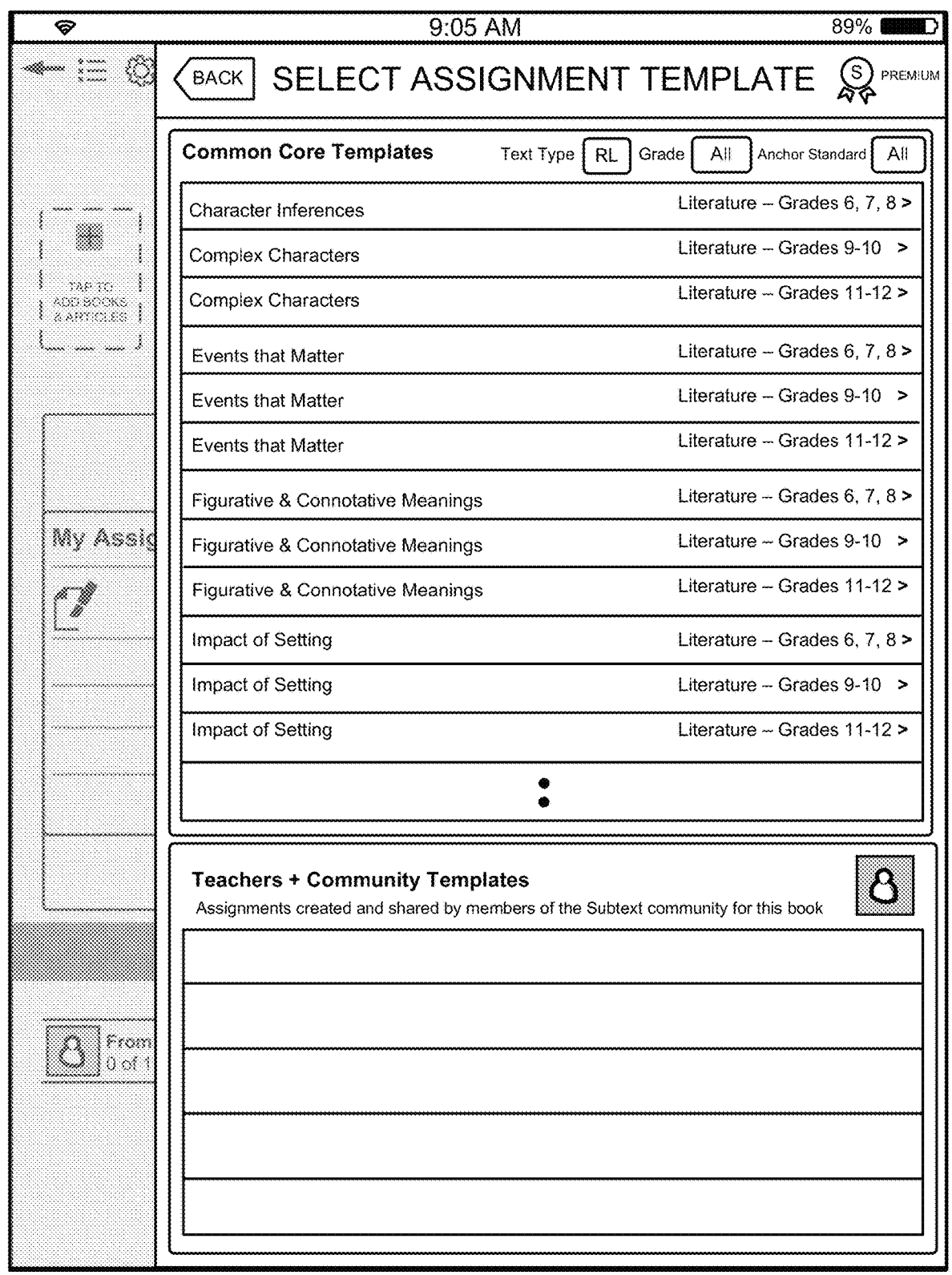
FIG. 8 is a graphical representation illustrating an example set of assignment templates for creation of assignments by users (e.g. a teacher).

FIGS. 8 through 22 illustrate various graphical display representations as they would appear on the display device that any of the users 114a through 114n would see. FIG. 8 illustrates an example graphical user interface configured to display a window a set of assignment templates for assignment creation (e.g., a teacher can crate assignments for students). The assignment templates may include common core templates and teacher and communication templates. Various tabs or buttons may facilitate selection of an assignment template. The screen displays how teachers may use tags through the assignment system. Assignments may also be created with no assistance by the system or from templates provided by the system.

Figure 9:
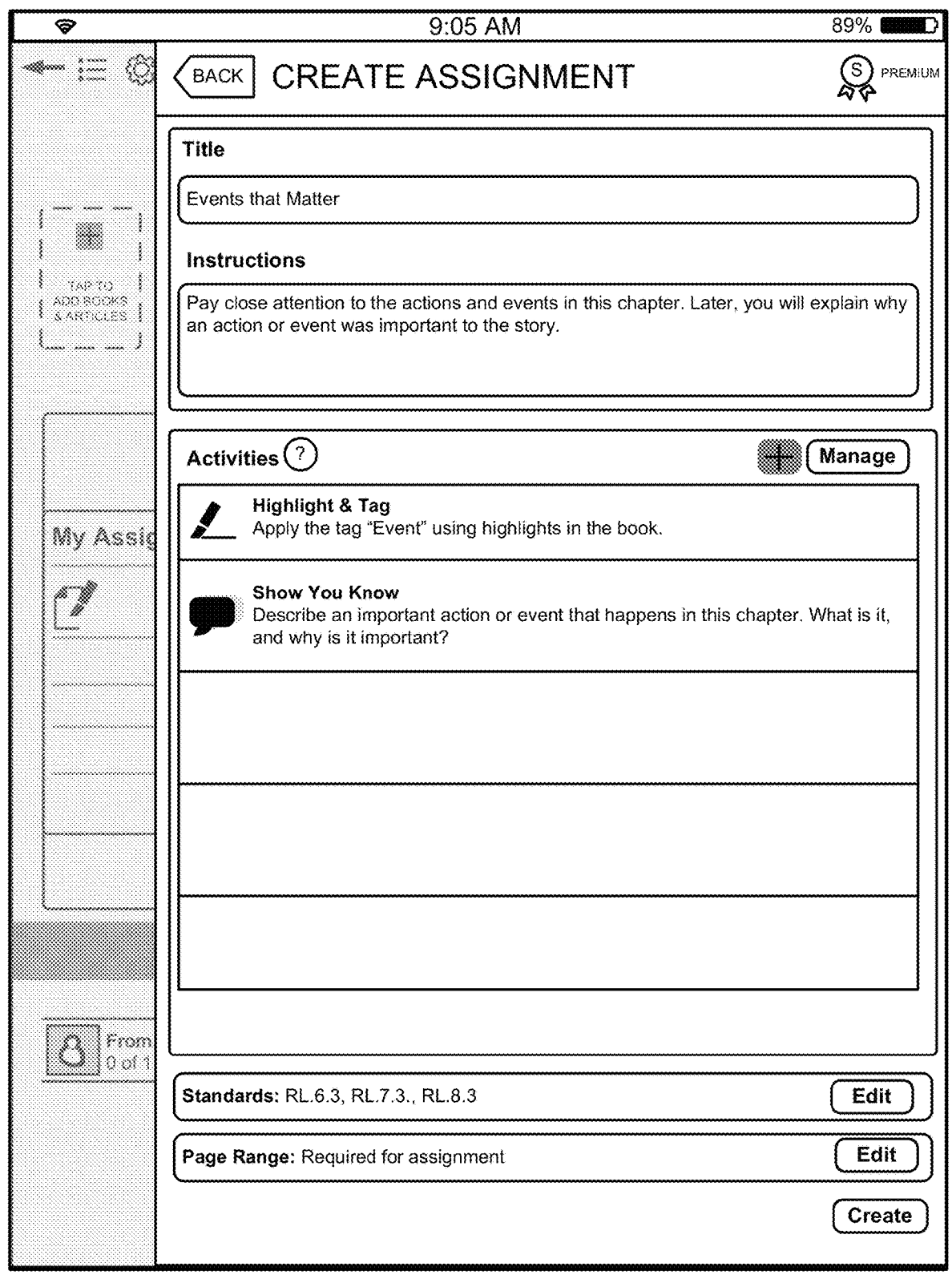
FIG. 9 is a graphical representation illustrating an example process for creating assignments by using an example assignment template.

FIG. 9 is an example graphical representation illustrating an assignment creation operation using an example assignment template. The example assignment template may include a title, instructions, activities, standards, page range etc. The screen as illustrated includes the start of one of the templates. It includes one highlight and one question.

Figure 10:
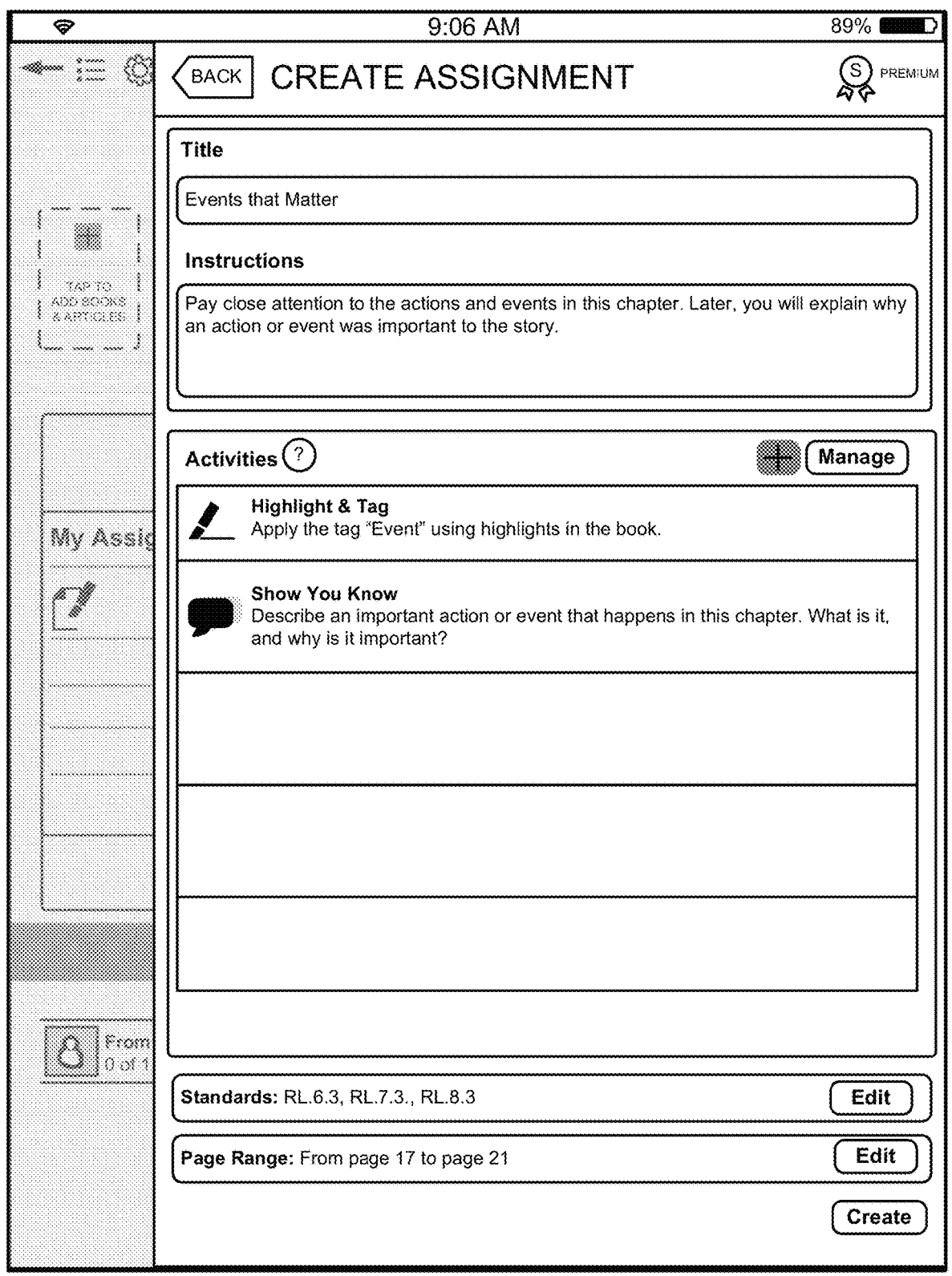
FIG. 10 is a graphical representation illustrating an example configuring operation for setting up a range of pages using an example assignment template.

FIG. 10 is an example graphical representation illustrating one or more operations or setting up a page range using an example assignment template. This graphical representation illustrates the task for creating an assignment with buttons and icons for performing particular functions. The illustrated example create assignment template illustrates areas for expression of a title, instructions, activities (designations), standards, and page ranges etc. The screen displays at the bottom that the assignment includes the numbers or a range of pages to read. The highlight from the teacher will automatically be visible to students when they read these pages. The question appears for viewing at the end.

Figure 11:
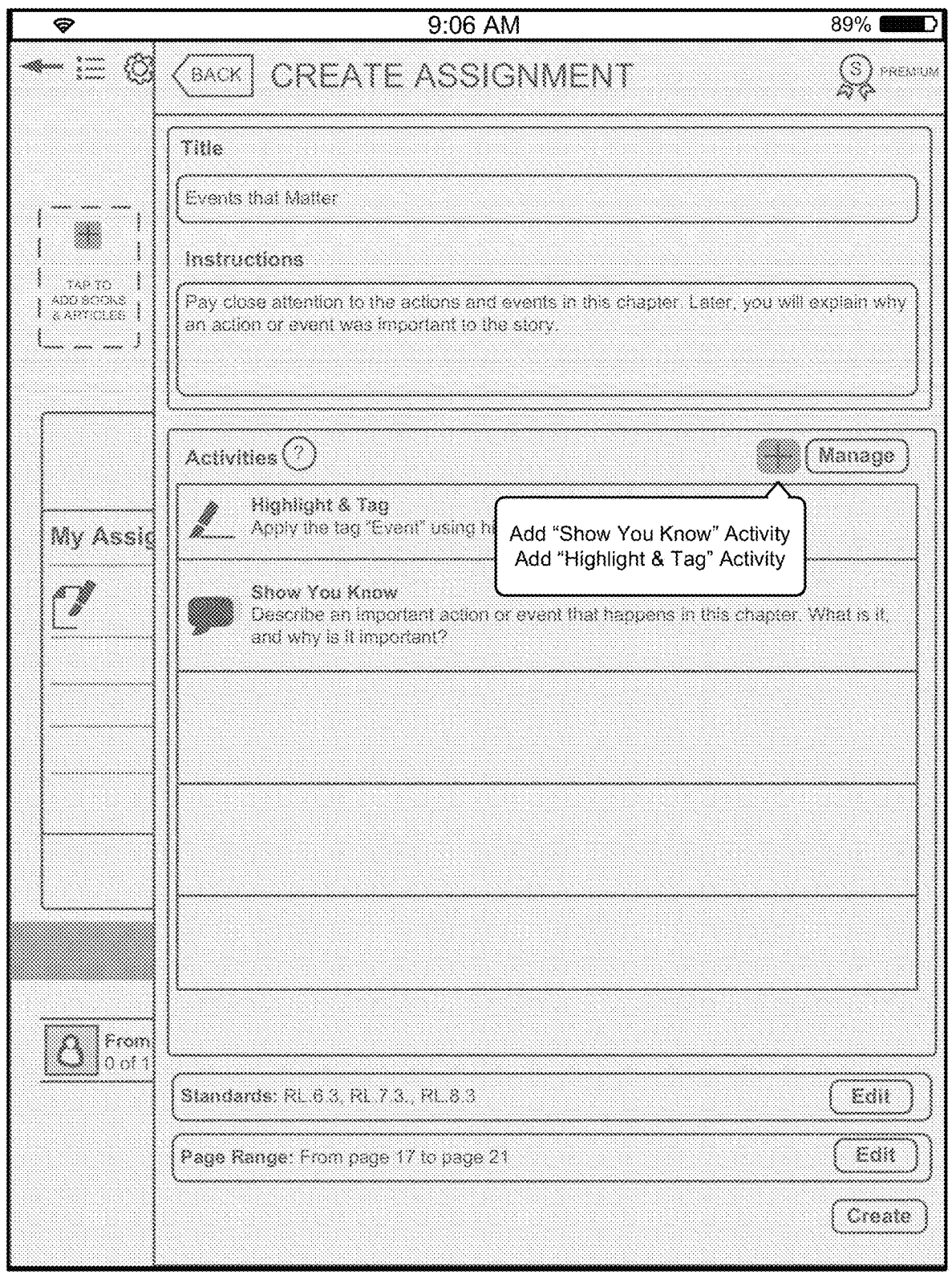
FIG. 11 is a graphical representation illustrating example configuring operations for setting up one or more activities using an example assignment template (as illustrated).

FIG. 11 is an example graphical representation of the user interface or screen display illustrating the setting up of one or more activities using an example assignment template. The illustrated example create assignment template illustrates areas for expression of a title, instructions, activities (designations), standards, and page ranges etc. A bubble illustrates operations, for example, "Add "Show You Know" Activity" and "Add 'Highlight & Tag' Activity." In some implementations, as this screen illustrates, teachers may choose to add another highlight or question activity. It should be recognized that other types of activities may designated as desired.

Figure 12:
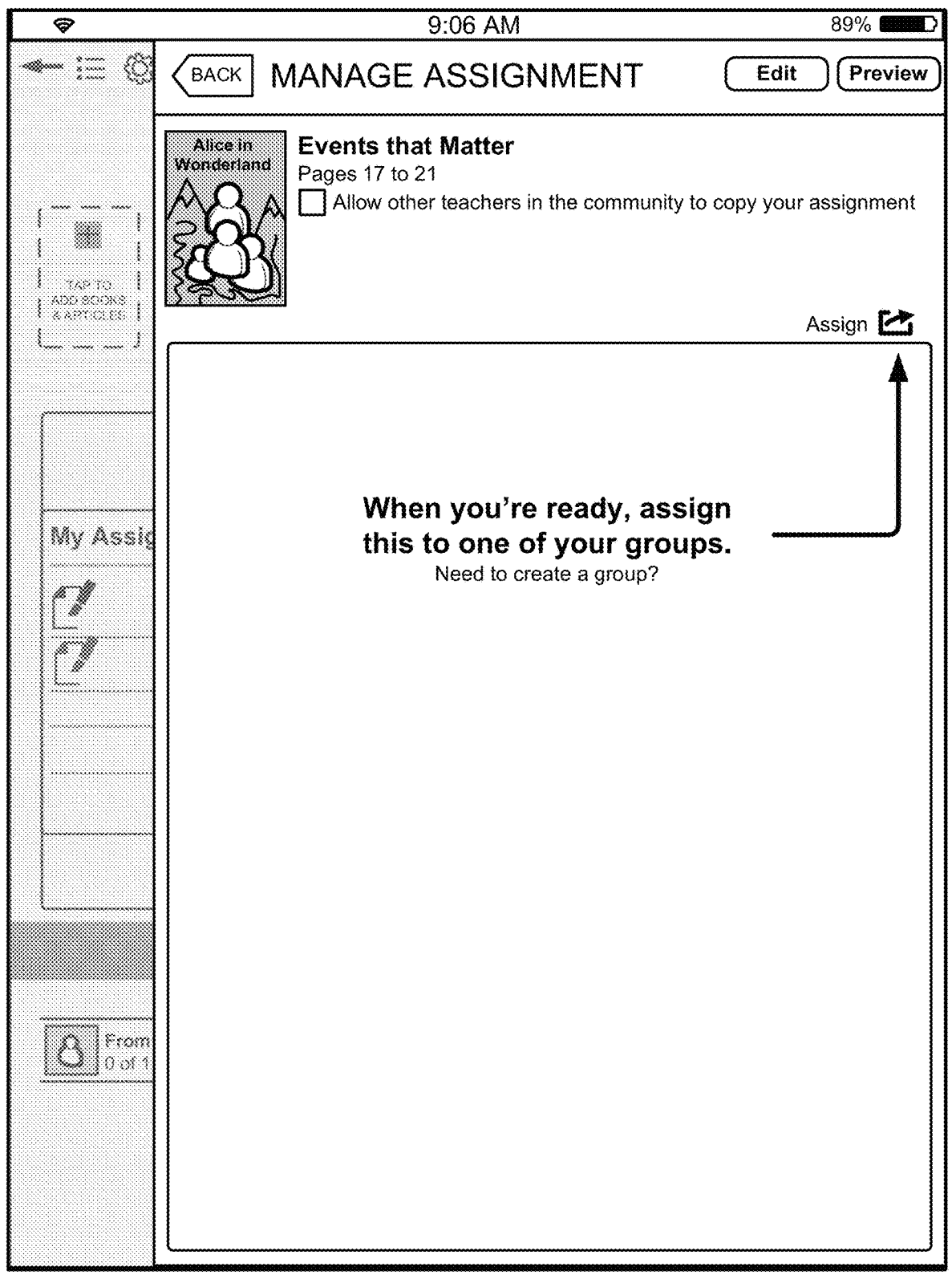
FIG. 12 is a graphical representation illustrating example operations including some for managing one or more user groups to which an assignment is sent.

FIG. 12 is an example graphical representation of a screen display illustrating the user interface configurations that may be pressed when a user is ready to assign an assignment or task to one of the groups. An option for creating a group may also be provided. In some implementations, once a particular teacher creates a particular assignment, the teacher may assign it to private class groups.

Figure 13:
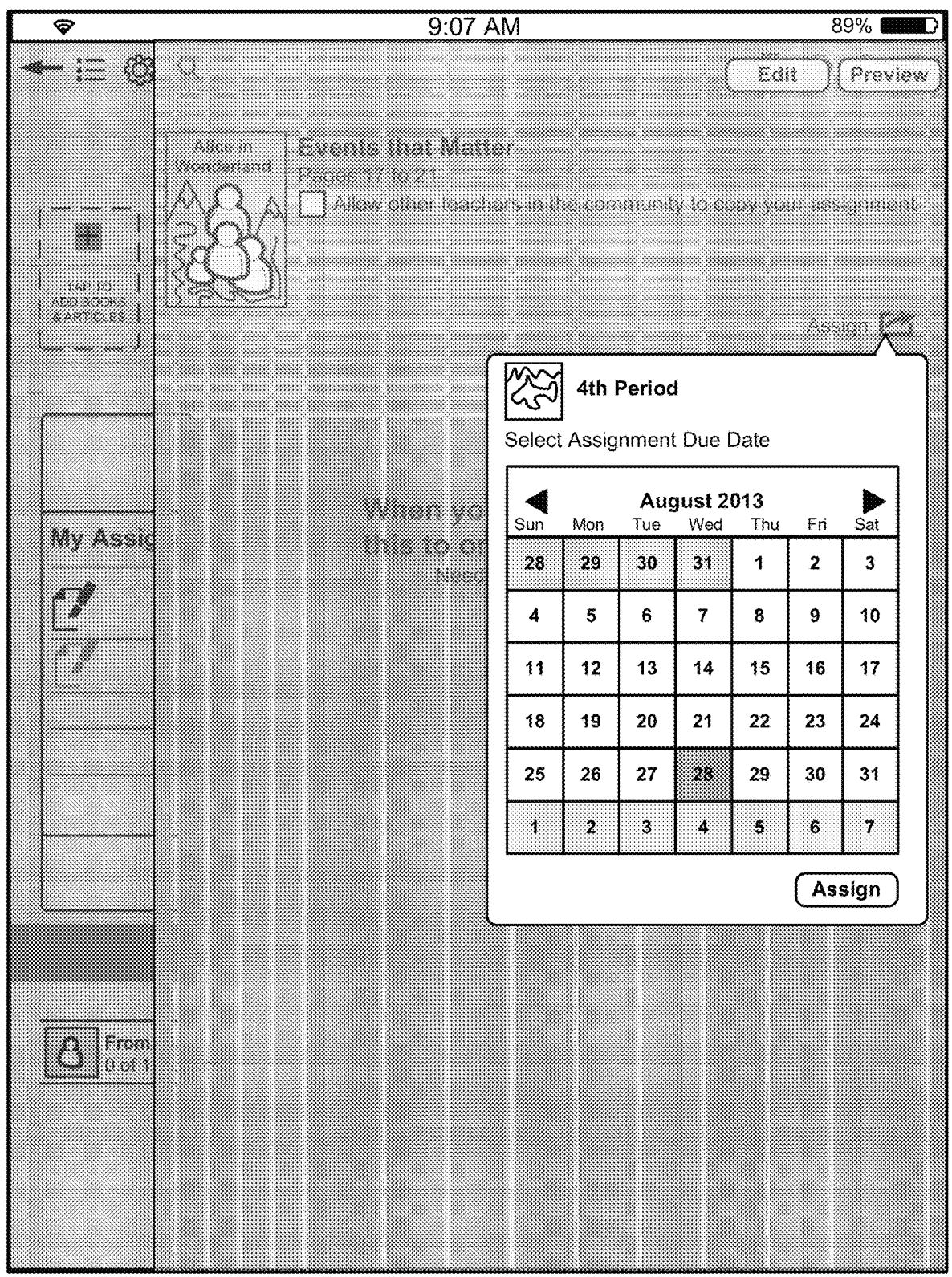
FIG. 13 is a graphical representation illustrating example operations including an operation or configuration for setting up a due date for an example assignment.

FIG. 13 is an example graphical representation of a screen display illustrating configurations, settings, and displays for setting up a due date for an example assignment. In this illustration, a calendar may be illustrated with appropriate buttons and icons. The screen as illustrated shows that assignments may include a due date. When the assignment is created, a message is automatically sent to the students giving them the details of the assignment e.g., the due date.

FIG. 14 is an example graphical representation illustrating an initial screen display that shows one or more options or tools provided to an example viewer upon selecting some text. The options may include highlight, discuss, search, and copy. Users may access the highlighting via a text selection menu.

FIG. 15 is an example graphical representation illustrating one or more highlighting options or tools for highlighting the text desired without an associated tag. This provides variations in the type of highlighting. Options that specify "No Tag" are indicated. In the illustrated example, a user can create or alter a highlight function so that the highlighting is visible to just the user high lighting the text, or otherwise. There is an option to edit the level or type of high lighting specified. The edit button is located in the top right of the menu. The highlight menu and the edit button allow users to associate tags with a particular highlight color.

FIG. 16 is an example graphical representation illustrating a menu of options or tools for adding one or more tags. This illustration shows an edit highlight tag and sharing options. The screen display as illustrated includes the highlight menu, which is specifically illustrated in its edit format here.

Figure 17:
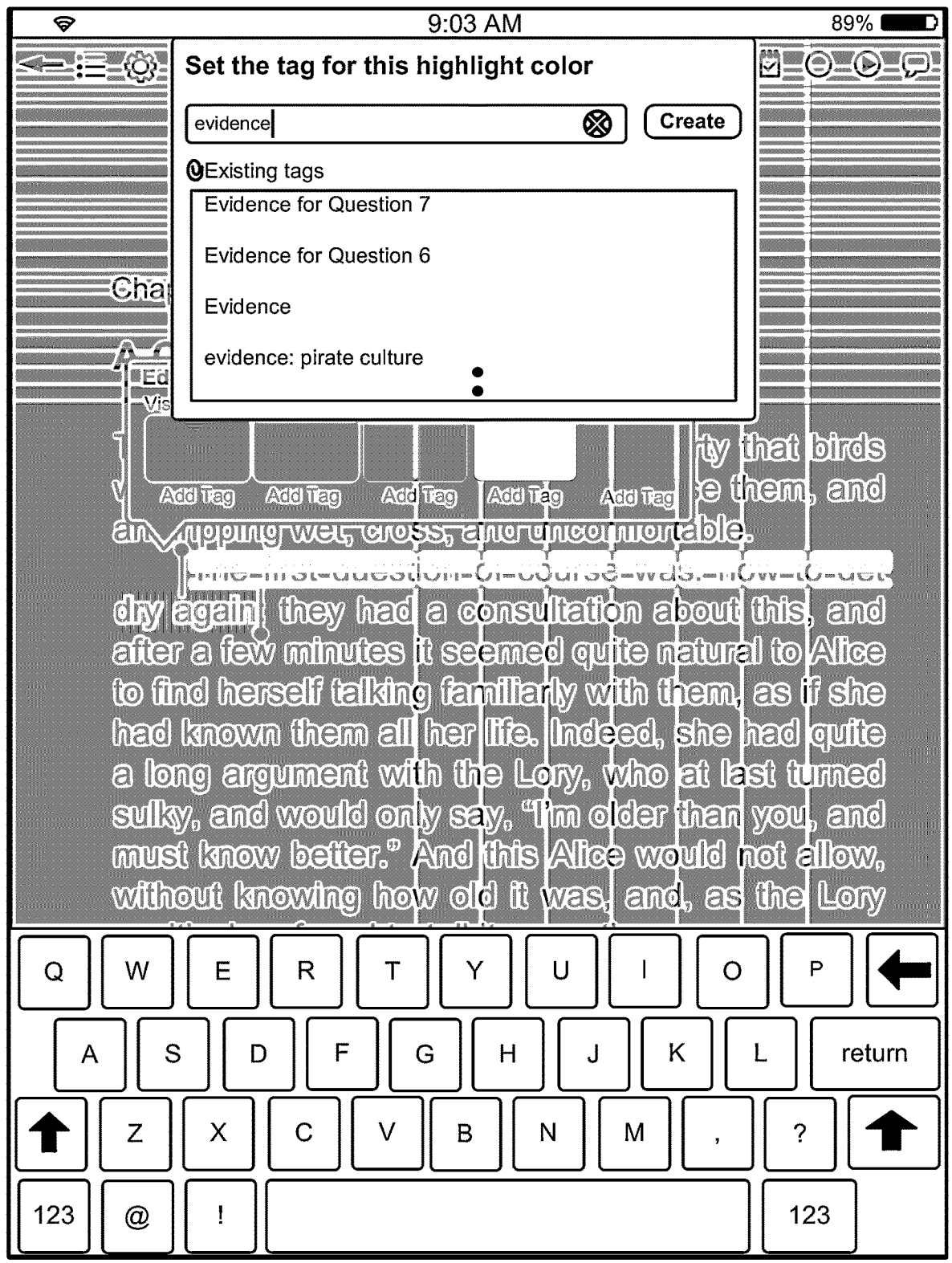
FIG. 17 is a graphical representation illustrating example options or configurations for setting up an example tag with example highlighting in a single action or activity.

FIG. 17 is an example graphical representation illustrating a user interface display for setting up an example tag for an example highlighting operation. This figure illustrates a screen display in which the user is illustrated as selecting a tag to associate it with a particular highlight color.

FIG. 18 is an example graphical representation illustrating sharing, tag, and/or highlighting status associated with example text that is selected. A display icon presents an option to create your highlight with additional options to customize the highlight to be visible just to the viewer and indicate no tags.

Figure 19:
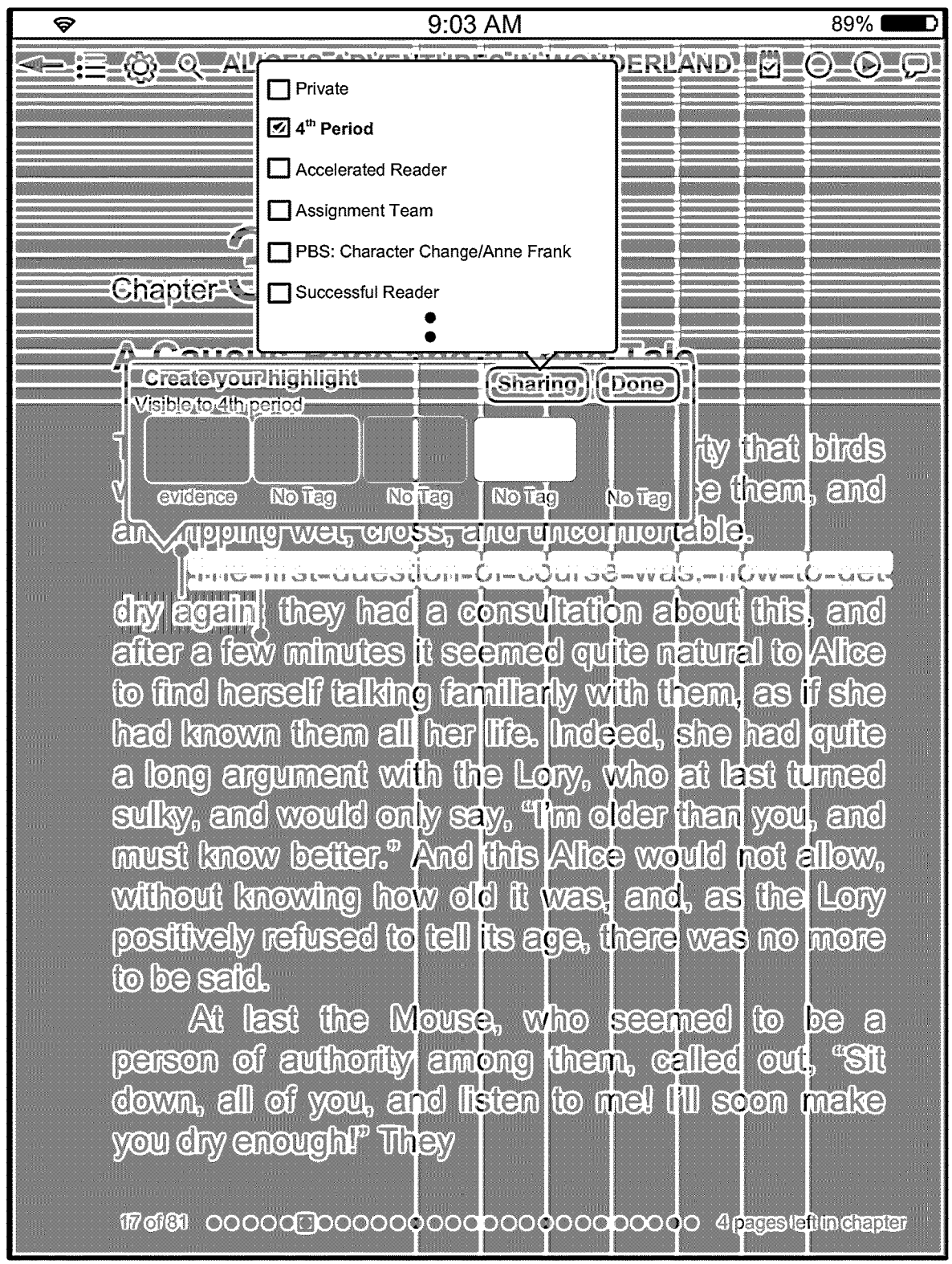
FIG. 19 is a graphical representation illustrating a sharing action with one or more user groups, of example text that was highlighted and tagged in a single action.

FIG. 19 is an example graphical representation illustrating sharing of an example highlighted/tagged text with one or more user groups. The screen as illustrated includes the highlight menu in its edit format. In the edit format of the highlight menu, a user may designate who should be able to see the user's highlights. With this setting, the user's highlights automatically moves from private to being visible to members of the user's 4th period group.

Figure 20:
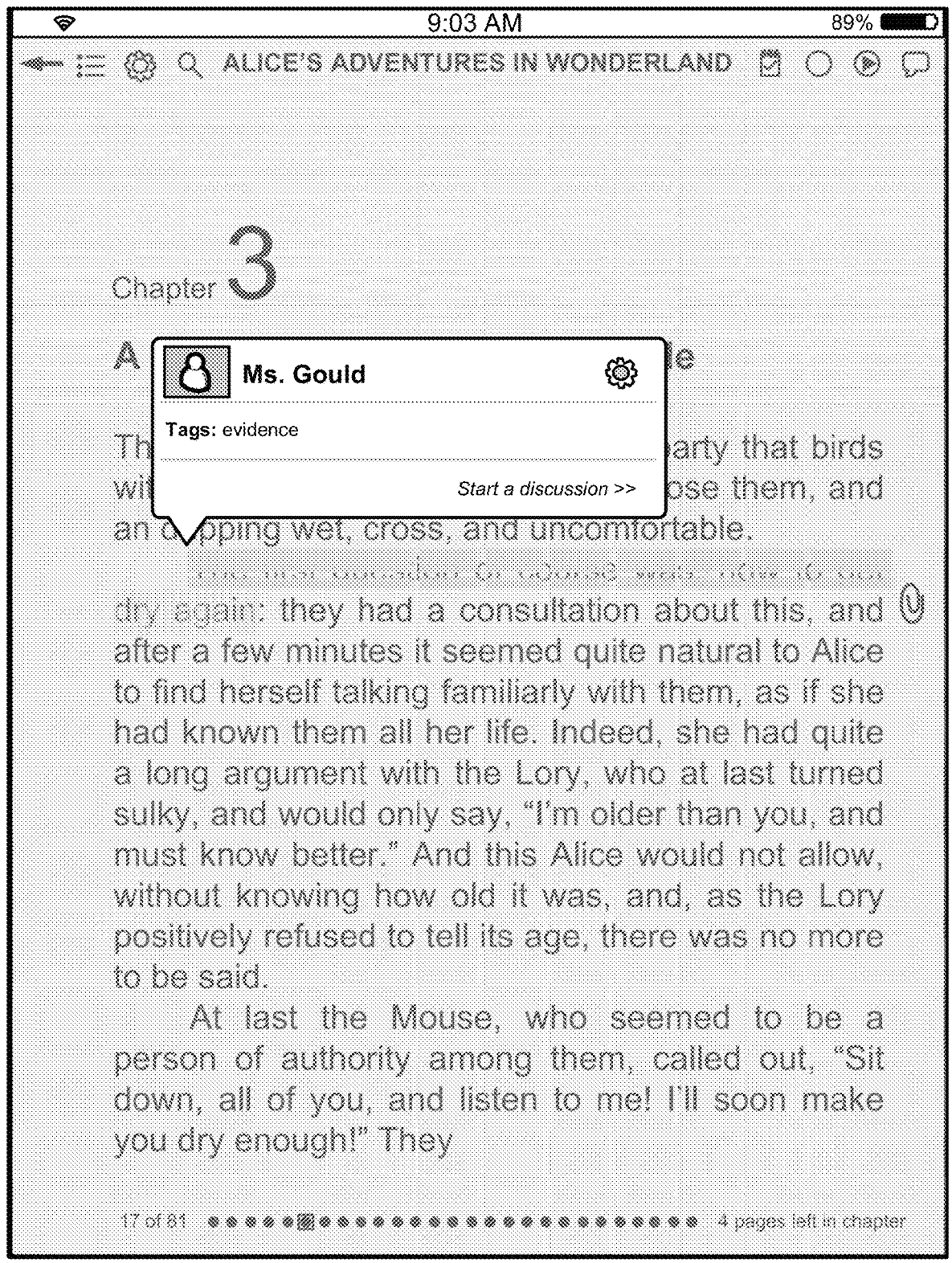
FIG. 20 is a graphical representation for starting a discussion among one or more groups of users on example text that is highlighted and tagged.

FIG. 20 is an example graphical representation for starting a discussion on an example highlighted/tagged text with one or more user groups. The screen as displayed illustrates one implementation of the assignment form and its configuration. There are many variations of this for students and teachers, depending on where the assignment is located in the workflow. The screen as illustrated includes a tag. In this implementation, when the highlight is applied, the users can see that the tag is available. This tag allows the users to quickly find all of users' examples of evidence in the illustrated book.

Figure 21:
FIG. 21 is a graphical representation illustrating an example assignment portal for target audience that has received assignment (e.g., a student's dashboard).

FIG. 21 is an example graphical representation illustrating an example assignment portal for a user receiving an assignment that is accorded to the user via the platform. In some implementations, the user is a student receiving an assignment from a teacher and this illustrates a student's dashboard. The graphical representation illustrates a screenshot of a screen displaying the student view in the assignment. The screen displays that a particular student's original tag is still there, and the tag that the teacher created in the assignment has also been added and is displayed.

Figure 22:
FIG. 22 is a graphical representation illustrating an example assignment portal for a user assigning an assignment (e.g., a teacher).

FIG. 22 is an example graphical representation illustrating an example assignment portal for an entity that is making the assignment (e.g., a teacher according an assignment or task to one or more groups of students). This graphical representation illustrates views of the assignment via the teacher's dashboard. The user interface display illustrates "My Assignment," with icons to return or go "back" to the prior view. The illustrated user interface also indicates instructions, and various activities, for example, "Activity 1—Highlight & Tag," "Activity 2—Show You Know," "Discussions," and "Grading." This figure illustrates a screenshot of a screen illustrating how the assignment automatically fills out with the tagged content from the student. Teachers can grade from this and students can use it to organize for studying or writing a paper.

Figure 23:
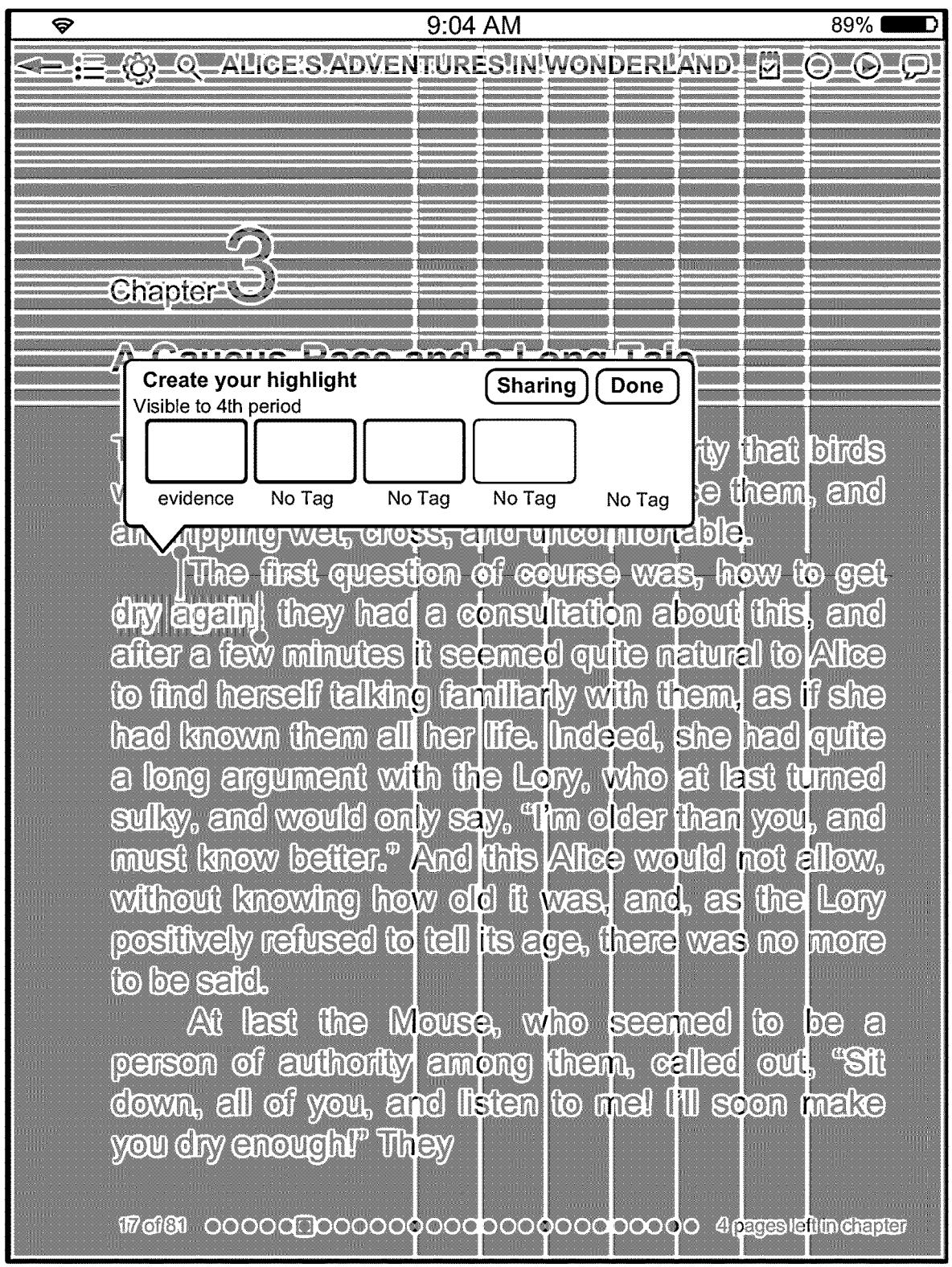
FIG. 23 is a graphical representation illustrating an example screen display designating visibility status of an example highlight and tag action by one user to one or more other users or groups.

FIG. 23 is a graphical representation illustrating an example screen display designating visibility status of an example highlight and tag action by one user to one or more other users or groups. The screen display shows the highlight menu in its edit format. In the edit format of the highlight menu, a user may designate the parties (or other users) to whom his or her highlights will be visible. With this setting and feature, a particular user's highlights change from a private designation to a visible designation, so that they are visible in the illustrated example to members of the user's 4th period group.

Figure 24:
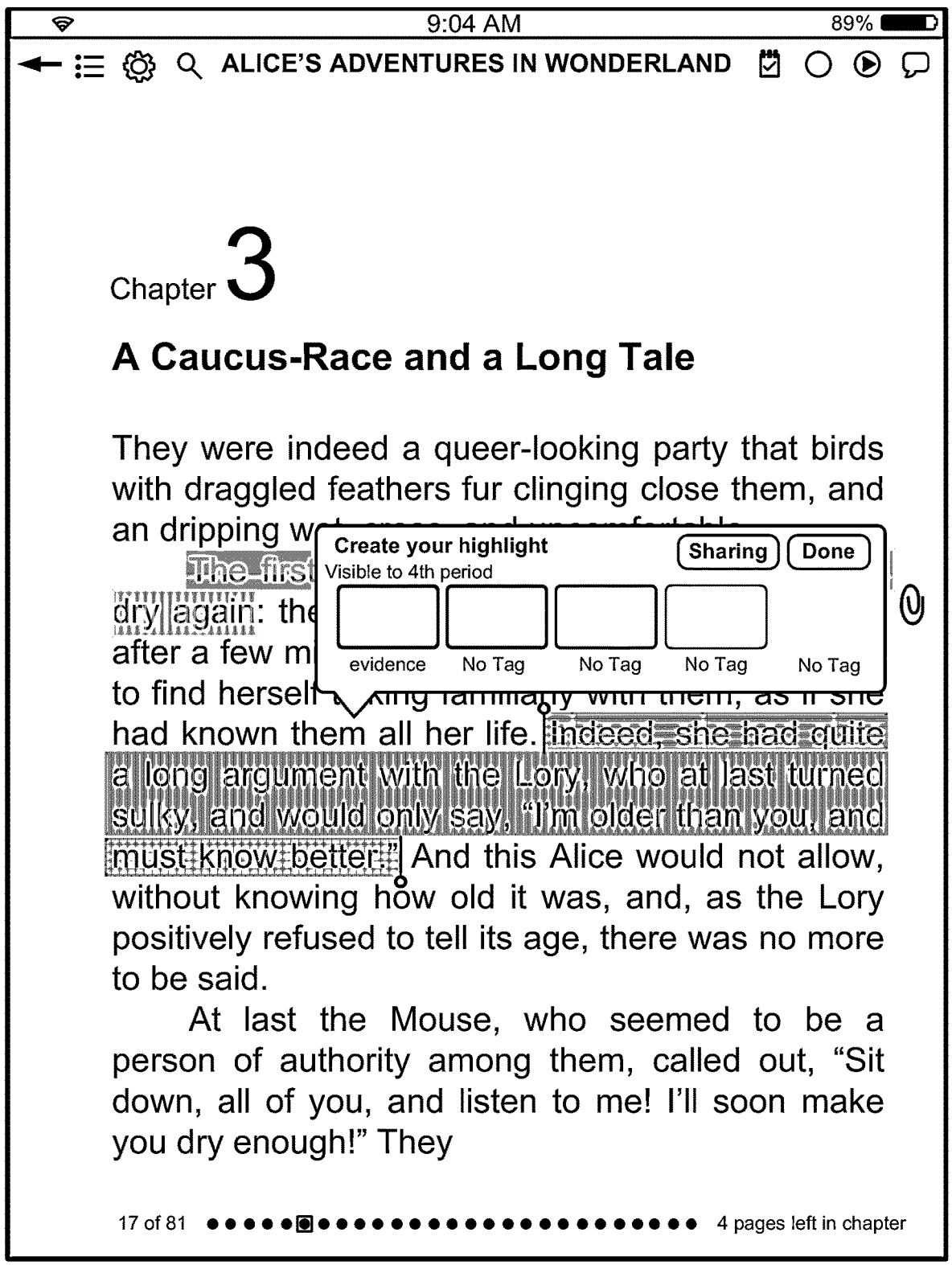
FIG. 24 is a graphical representation illustrating an example tag(s), highlighting, and visibility status associated with a second example text that is selected for these operations.

FIG. 24 is a graphical representation illustrating an example tag(s), highlighting, and visibility status associated with a second example text that is selected for these operations. This screen display includes a highlight menu, which as illustrated, is configured. This configuration is available in the illustrated book until users change it. This configuration shows an evidence tag that is attached to the highlight (in this example, in a color purple) and sharing set to the $4^{th}$ Period.

In the preceding description, for purposes of explanation, numerous specific details have been set forth in order to provide a thorough understanding this technology. It will be apparent, however, that this technology can be practiced without some of these specific details that are disclosed here. In other instances, structures and devices have been shown in block diagram form in order to avoid obscuring the innovative aspects. For example, the present technology is described in some implementations above with reference to particular hardware and software, yet it is not limited to only the particular hardware and software referenced.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present inventive technology be limited not by this detailed description, but rather by the claims of this application. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three. Also, wherever a component, an example of which is a module, of the present inventive technology is implemented as software, the component can be implemented as a stand-alone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present inventive technology is intended to be illustrative, but not limiting, of the scope of the present invention, which is set forth in the following claims.

What is claimed is:

1. A computer-implemented method, comprising:
   receiving, by a content-management data processor and a first set of executable code causing said content-management data processor to execute one or more control actions on electronic content relating to an assignment viewable on a first electronic device;
   providing, by said content-management data processor a user interface to the first electronic device, said user interface permitting a first user to execute a single activity including first highlighting and tagging of a portion of the electronic content by the first user via the first electronic device, the single activity presenting options including the first highlighting and tagging of the portion of the electronic content selectable or insertable based upon a single action, the highlighting a function executable by providing a set of colors via the user interface that are selectable, and receiving an input of a particular color designation via the user interface from the first user and receiving a tag designation via the user interface from the first user and providing the tag designation with at least the portion of text that is highlighted and tagged in the single activity to other users including at least one other second user to be automatically visible to the at least the one other second user on a second electronic device, the highlighting the function including an edit feature to indicate a visibility designation for the other users;
   providing for display, by said content-management data processor, the electronic content with at least the portion of the text that is highlighted and tagged in the single activity for viewing on the second electronic device by at least the one other second user through a highlighting menu;
   creating the assignment, by said content-management data processor and executing a control action to use an assignment template wherein the assignment template is presented to the first user on the first electronic device and the assignment is created by receiving input by the first electronic device associating one or more additional activities with the assignment in addition to at least the single activity, the one or more additional activities designated for completion by a given due date, and receiving a request by the at least one other second user to open the assignment and automatically receive the assignment through the highlighting menu for display on said second electronic device;
   receiving user discussion on one or more search results of a particular event including one or more highlights and one or more tags by a search engine for the one or more search results related to the particular event; and
   managing, by the content-management data processor, a due date associated with the assignment.

2. The computer-implemented method of claim 1, wherein the single activity presents said options to the first electronic device querying to highlight at least the portion of the electronic content, and add the tag designation, which are selectable or insertable by the first user based upon the single action and a plurality of other users are able to add another tag designation within the tag designation originated by the first user.

3. The computer-implemented method of claim 1, further comprising:

receiving said user discussion by said search engine for the one or more search results related to the particular event with additional markups.

4. The computer-implemented method of claim 3, wherein said first user creates a tag designation named evidence and associates said tag designation with a particular text in the assignment in a certain page range.

5. The computer-implemented method of claim 1, further comprising:
providing a display icon to present an option to create a highlight with the one or more additional activities configured to customize said highlight to be visible just to a viewer and to indicate no tag designations.

6. The computer-implemented method of claim 5, wherein the one or more additional activities include a question-and-answer activity associated with the assignment.

7. The computer-implemented method of claim 5, further comprising:
managing, by said content-management data processor and executable code stored in memory that causes said content-management data processor to associate the one or more additional activities with the assignment.

8. The computer-implemented method of claim 1, further comprising:
receiving, by said content-management data processor and executable code stored in memory that causes said content-management data processor to receive, the assignment including the single activity and the one or more additional activities performed by the other users to whom the assignment was sent, for grading.

9. A computer program product comprising a non-transitory computer usable medium including a computer readable program, wherein the computer readable program when executed on a computer causes the computer to:
present electronic content relating to an assignment for display and viewing by a first user on a first electronic device;
provide a user interface to the first user on the first electronic device configured to permit the first user to select and execute a single activity including first highlighting and tagging with respect to at least a portion of the electronic content by a first user that is displayed on the first electronic device, the single activity presenting options that are executable by an action bar in the user interface based upon a single action, by which instructions are received from the first user, the single activity presenting the options within the user interface that are executable based upon a single action to automatically attach a tag designation and a highlight to the portion of the electronic content that is displayed on the first electronic device, said highlight executable by providing a set of colors on the first electronic device viewable by the first user and receiving an input via the first electronic device, the input with a color designation from the first user and receiving the tag designation from the first user and providing at least the portion of text that is highlighted and tagged in the single activity to other users including at least one other second user, to be automatically visible to the at least one other second user, on a second electronic device, the highlighting the function including an edit feature to execute a visibility designation for the other users;
provide the electronic content with at least the portion of the text with said tag designation and said highlight attached in the single activity for a plurality of second electronic devices for use, respectively, by other users;
execute a control action to use an assignment template wherein the assignment template is presented to the first user on the first electronic device and the assignment is created by receiving input by the first user device associating one or more additional activities with the assignment in addition to at least the single activity including the highlight and the tag designation attached, the one or more additional activities for completion by a given due date, and receiving a request by at least one other second user to open the assignment and automatically displaying the assignment with the portion of the text with said tag designation and said highlight attached to the one other second user, and configured to receive the one or more additional activities by the one other second user within the tag designation of the portion of the electronic content; and
receive a user-provided discussion on search results relating to a particular event including one or more highlights and one or more tag designations; and
manage a due date associated with the assignment.

10. The computer program product of claim 9, wherein the single activity presents options via said first electronic device to query the first user to highlight at least the portion of the electronic content and to add a tag designation, which are insertable by the user based upon a single action.

11. The computer program product of claim 10, wherein the computer readable program when executed on the computer further causes the computer to:
receive said user provision of said discussion on the search results by a search engine for one or more search results related to the particular event including additional markups.

12. The computer program product of claim 11, wherein said first user creates a tag designation named evidence and associates said tag designation with a particular text in an assignment in a certain page range.

13. The computer program product of claim 10, wherein the computer readable program when executed on the computer further causes the computer to:
provide a display icon to present an option to create a highlight with the one or more additional activities configured to customize said highlight to be visible just to a viewer and to indicate no tag designations.

14. The computer program product of claim 13, wherein the additional activities include a question-and-answer activity associated with the assignment.

15. The computer program product of claim 13, wherein the computer readable program when executed on the computer further causes the computer to:
manage one or more of the other users for performing the one or more additional activities associated with the assignment.

16. The computer program product of claim 13, wherein the computer readable program when executed on the computer further causes the computer to:
receive the assignment, including the single activity and additional other activities performed by the other users to whom the assignment was sent, for grading.

17. A system comprising:
a content-management data processor; and
a non-transitory-computer-readable medium storing instructions that, when executed, cause the content-management data processor to:
receive electronic content for viewing by a first user on an electronic device;

provide a user interface to the first user on the first electronic device configured to permit the first user to execute a single activity with respect to at least a portion of the electronic content displayed on the electronic device, the single activity including highlighting and tagging of the portion of the electronic content, the single activity presenting options to the first electronic device with a query to highlight at least the portion of the electronic content and add a tag designation to the portion of the electronic content with highlighting, insertable by the first user by a single action;

provide for display, by the content-management data processor, the electronic content with at least the portion of a text that is highlighted with the tag designation in the single activity to at least a second user on a second user's electronic device by automatically displaying the portion of the text that is highlighted with the tag designation through a highlighting menu to enable the second user to add one or more additional activities within the tag designation to render the one or more additional activities to be automatically visible to the first user.

18. The system of claim 17, wherein said first user creates a tag designation named evidence and associates said tag designation with a particular text in an assignment in a certain page range.

19. The system of claim 18, wherein the additional activities associated with a portion of the particular text include a question-and-answer activity associated with an assignment.

20. The system of claim 19, wherein the non-transitory-computer-readable medium further stores instructions that cause the content-management data processor to:
provide the assignment to other users for completion by a due date.

21. The system of claim 20 wherein the user interface is configured to receive input selecting and executing the single activity.

22. The system of claim 21 wherein the single activity is executable by the single action via an action bar in the user interface and configured to automatically create and attach a highlighting function and a tagging function to the portion of the electronic content that is displayed on the first electronic device by the single action, the highlighting function being executable by providing a set of colors via the user interface that are selectable, and receiving an input of a particular color designation via the user interface from the first use and receiving a tag designation via the user interface from the first user and providing at least the portion of text that is highlighted and tagged in the single activity to other users, the highlighting function including an edit feature to indicate a visibility designation for the other users.

23. The system of claim 21, wherein the single activity presents options to the user to highlight at least the portion of the electronic content and to add a tag, which are selectable or insertable by the user based upon a single action.

24. The system of any of claim 21, wherein the non-transitory-computer-readable medium further stores instructions that cause a content-manager data processor to:
create an assignment using an assignment template, wherein the assignment template is presented to the user and the user creates the assignment; and
associate one or more activities with the assignment including at least the single activity including highlighting and tagging.

25. The system of claim 24, wherein the one or more activities are designated for completion by a given due date.

26. The system of claim 25, wherein the one or more activities include a question-and-answer activity associated with the assignment.

27. The system of claim 26, wherein the non-transitory-computer-readable medium further stores instructions that cause a content-manager data processor to:
manage one or more of the other users for performing the one or more activities associated with the assignment;
manage a due date associated with the assignment;
provide the assignment to the other users for completion by the due date; and
receive the assignment including the single activity and one or more other activities performed by the other users for grading.

28. The system of claim 27, wherein the instructions, when executed, further cause the content-manager data processor to receive user discussion on one or more search results of a particular event including one or more highlights and one or more tags by a search engine for the one or more search results related to the particular event.

* * * * *

UNITED STATES PATENT AND TRADEMARK OFFICE
CERTIFICATE OF CORRECTION

PATENT NO. : 11,527,172 B2
APPLICATION NO. : 14/474025
DATED : December 13, 2022
INVENTOR(S) : Andrew Goldman et al.

It is certified that error appears in the above-identified patent and that said Letters Patent is hereby corrected as shown below:

In the Claims

In Column 21, Line 63, please replace "the highlighting the function" with --the highlighting a function--

Signed and Sealed this
Fifteenth Day of August, 2023

Katherine Kelly Vidal
*Director of the United States Patent and Trademark Office*